(12) United States Patent
Joshi et al.

(10) Patent No.: US 11,669,687 B1
(45) Date of Patent: Jun. 6, 2023

(54) SYSTEMS AND METHODS FOR NATURAL LANGUAGE PROCESSING (NLP) MODEL ROBUSTNESS DETERMINATION

(71) Applicant: Wells Fargo Bank, N.A., San Francsico, CA (US)

(72) Inventors: Tarun Joshi, San Francisco, CA (US); Rahul Singh, San Francisco, CA (US); Vijayan Nair, San Francisco, CA (US); Agus Sudjianto, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 314 days.

(21) Appl. No.: 17/096,201

(22) Filed: Nov. 12, 2020

(51) Int. Cl.
*G06F 40/284* (2020.01)
*G06F 40/253* (2020.01)
*G06N 20/00* (2019.01)
*G06F 21/57* (2013.01)
*G06F 40/30* (2020.01)

(52) U.S. Cl.
CPC .......... *G06F 40/284* (2020.01); *G06F 21/577* (2013.01); *G06F 40/253* (2020.01); *G06F 40/30* (2020.01); *G06N 20/00* (2019.01); *G06F 2221/033* (2013.01)

(58) Field of Classification Search
None
See application file for complete search history.

(56) References Cited

U.S. PATENT DOCUMENTS

| | | | |
|---|---|---|---|
| 2020/0226212 A1* | 7/2020 | Tan | G06V 30/1988 |
| 2020/0372319 A1* | 11/2020 | Sun | G06N 3/008 |
| 2021/0089904 A1* | 3/2021 | Chung | G06F 17/18 |
| 2021/0173872 A1* | 6/2021 | Tan | G06F 40/211 |

(Continued)

OTHER PUBLICATIONS

Marco Tulio Ribeiro, Sameer Singh, and Carlos Guestrin. 2018. Semantically Equivalent Adversarial Rules for Debugging NLP models. In Proceedings of the 56th Annual Meeting of the Association for Computational Linguistics (vol. 1: Long Papers), pp. 856-865, Melbourne, Australia. (Year: 2018).*

(Continued)

*Primary Examiner* — Richemond Dorvil
*Assistant Examiner* — Alexander G Marlow
(74) *Attorney, Agent, or Firm* — Womble Bond Dickinson (US) LLP

(57) ABSTRACT

Systems, apparatuses, methods, and computer program products are disclosed for determining robustness information for an NLP model. Modification rules, such as replacement rules and/or insertion rules, are used to generate instances of modified test data based on instances of test data that comprise words and have a syntax and a semantic meaning. The instances of test data and modified test data are provided to the NLP model and the output of the NLP model is analyzed to determine output changing instances of modified test data, which are instances of modified test data yielded output from the NLP model that is different and/or not similar to the output yielded from the NLP model for the corresponding instance of test data. Robustness information for the NLP model is determined based at least in part on the output changing instances of modified test data. White and/or black box attacks may be performed.

20 Claims, 10 Drawing Sheets

(56) References Cited

U.S. PATENT DOCUMENTS

| | | | | |
|---|---|---|---|---|
| 2021/0319784 | A1* | 10/2021 | Le Roux | G06N 3/08 |
| 2021/0326751 | A1* | 10/2021 | Liu | G06N 3/084 |
| 2021/0334459 | A1* | 10/2021 | Dvijotham | G06N 20/00 |

OTHER PUBLICATIONS

Eric Wallace, Shi Feng, Nikhil Kandpal, Matt Gardner, Sameer Singh, "Universal Adversarial Triggers for Attacking and Analyzing NLP" arXiv: 1908.07125v2 (Year: 2019).*

Pepa Atanasova, Dustin Wright, Isabelle Augenstein "Generating Label Cohesive and Well-Formed Adversarial Claims" arXiv: 2009.08205v1 (Year: 2020).*

Emanuele La Malta et al. "Assessing Robustness of Text Classification through Maximal Safe Radius Computation" arXiv: 2010.02004v2 (Year: 2020).*

M. Behjati, S. -M. Moosavi-Dezfooli, M. S. Baghshah and p. Frossard, "Universal Adversarial Attacks on Text Classifiers," ICASSP 2019—2019 IEEE International Conference on Acoustics, Speech and Signal Processing (ICASSP), 2019, pp. 7345-7349, doi: 10.1109/ICASSP.2019.8682430. (Year: 2019).*

Di Jin, Zhijing Jin, Joey Tianyi Zhou, Peter Szolovits "Is BERT Really Robust? A Strong Baseline for Natural Language Attack on Text Classification and Entailment" arXiv:1907.11932v6 (Year: 2020).*

Rahul Singh, Tarun Joshi, Vijayan N. Nair, and Agus Sudjianto "Model Robustness with Text Classification: Semantic-preserving adversarial attacks" arXiv:2008.05536v2 (Year: 2020).*

[15] Y. Kim, "Convolutional neural networks for sentence classification," arXiv preprint arXiv:1408.5882, 2014.

Alzantot et al., "Generating natural language adversarial examples," arXiv preprint arXiv:1804.07998, 2018.

Devlin et al., "Bert: Pre-training of deep bidirectional transformers for language understanding," arXiv preprint, vol. arXiv:1810.04805, 2018.

Ebrahimi et al., "Hotflip: White-box adversarial examples for text classification," arXiv preprint arXiv: 1712.06751, 2017.

I. Goodfellow, J. S. J. and S. Christian, "Explaining and harnessing adversarial examples," arXiv preprint arXiv:1412.6572, 2014.

Jia et al., "Adversarial examples for evaluating reading comprehension systems," arXiv preprint arXiv: 1707.07328, Jul. 23, 2017.

Johnson et al., "Effective use of word order for text categorization with convolutional neural networks.," arXiv preprint arXiv:1412.1058., 2014.

Kingma et al., "Adam: A method for stochastic optimization.," arXiv preprint arXiv:1412.6980, 2014.

Liang et al. "Deep text classification can be fooled.," arXiv preprint arXiv: 1704.08006, 2017.

McAuley et al., "Hidden factors and hidden topics: understanding rating dimensions with review text," In Proceedings of the 7th ACM conference on Recommender systems, pp. 165¬172, 2013.

Nicolas et al., "The limitations of deep learning in adversarial settings.," IEEE European symposium on security and privacy, pp. 372-387, 2016.

Paszke et al., "Automatic differentiation in Pytorch," NIPS-W, 2017.

Pennington, R et al., "Glove: Global vectors for word representation.," In Proceedings of the 2014 conference on empirical methods in natural language processing (EMNLP), pp. 1532-1543, 2014.

Ren et al., "Generating natural language adversarial examples through probability weighted word saliency," In Proceedings of the 57th annual meeting of the association for computational linguistics, pp. 1085-1097, 2019.

Ribeiro et al., "Semantically equivalent adversarial rules for debugging NLP models.," Proceedings of the 56th Annual Meeting of the Association for Computational Linguistics, pp. 856-865, 2018.

Sanh et al., "DistilBERT, a distilled version of BERT: smaller, faster, cheaper and lighter," arXiv preprint arXiv:1910.01108., 2019.

Suranjana et al., "Towards crafting text adversarial samples.," arXiv preprint arXiv: 1707.02812, 2017.

Szegedy et al., "Intriguing properties of neural networks," arXiv preprint arXiv: 1312.6199, 2013.

Vaswani et al., "Attention is all you need," 31st Conference on Neural Information Processing Systems (NIPS), dated Dec. 6, 2017.

Wallace et al., "Universal adversarial triggers for attacking and analyzing NLP," arXiv preprint arXiv:1908.07125, dated Aug. 29, 2019.

Wolf et al., "HuggingFace's Transformers: State-of-the-art Natural Language Processing," ArXiv, vol. abs/1910.03771, 2019.

Yuan et al., "Adversarial examples: Attacks and defenses for deep learning.," IEEE transactions on neural networks and learning systems, pp. 2805-2824, 2019.

* cited by examiner

SYSTEMS AND METHODS FOR NATURAL LANGUAGE PROCESSING (NLP) MODEL ROBUSTNESS DETERMINATION

TECHNOLOGICAL FIELD

Example embodiments of the present disclosure relate generally to determining the robustness of natural language processing (NLP) and, more particularly, to systems and methods for determining and/or improving robustness of NLP models for text classification.

BACKGROUND

NLP models are machine learning trained models (e.g., deep neural networks and/or the like) that are trained to make determinations based on an input text. In various scenarios, the training data used to train an NLP model may not be particularly similar to future data sets that the NLP model may be used analyse.

BRIEF SUMMARY

In various instances, an NLP model, such as a text classification model, for example, may be trained using a first data set. At some point in the future, the NLP model may be used to analyse a second data set. In various scenarios, the second data set may include components that are comprised of different tokens but that are semantically similar to components of the first data set. A robust text classification NLP model would classify the components of the second data set that are comprised of different tokens but that are semantically similar to components of the first data set and the similar components of the first data set as being of the same classification. However, in various situations, text classification NLP models may fail to classify the components of the second data set that are comprised of different tokens but that are semantically similar to components of the first data set and the similar components of the first data set as being of the same classification. For example, the text classification NLP model may fail to be robust and/or may have a low to moderate level of robustness. As used herein, an NLP model is robust when two components that are semantically similar but comprise at least one different token (e.g., word) yield similar and/or the same result or model output. In the example where the NLP model is a text classification model, the NLP model is robust when two components that are semantically similar but comprise at least one different token (e.g., word) are classified as having the same classification.

Various embodiments of the present disclosure provide methods, apparatus, systems, computer program products, and/or the like for determining the robustness of an NLP model (e.g., a text classification NLP model). In various embodiments, the determining of the robustness of an NLP model may additionally yield robustness information that may indicate how the NLP model may be further trained and/or re-trained to better improve the robustness of the NLP model. In various embodiments, one or more white box and/or black box attacks of one or more NLP models may be initiated and the results may be analysed to determine robustness information for each of the one or more NLP models. In general, a white box attack on a model is an attack or test of the model where information regarding the model is known (e.g., the loss function, the embedding space of the model, the gradient of the loss function for various locations within the embedding space, model parameters, and/or the like). In general, a black box attack on a model is an attack or test of the model where information regarding the model is not known.

In various embodiments, one or more white box attacks of one or more first NLP models may be performed to identify modification rules that may be used to modify instances of test data and/or to determine the robustness of the one or more NLP models. The instances of test data and the instances of modified test data (instances of test data modified based on modification rules) may be provided to a first NLP model to determine the robustness of the first NLP model and/or to determine modification rules that are likely to interrogate the robustness of another NLP model. The modification rules that are identified as likely to interrogate the robustness of an NLP model may be compiled, possibly generalized, and used to perform one or more black box attacks of one or more second NLP models to determine the robustness of the one or more second NLP models. In various embodiments, modifying an instance of test data based on the modification rules may cause replacing a replacement trigger token group with a replacement token group. In various embodiments, modifying an instance of test data based on the modification rules may cause inserting an insertion token into the instance of test data in a relative position corresponding to a target part of speech (POS) token.

According to a first aspect, a method for determining the robustness of an NLP model (or other machine learning-trained model) is provided. In an example embodiment, the method comprises identifying, by processing circuitry, at least one potential trigger token by searching the embedding space of a first NLP model based at least in part on a loss function for the first NLP model; obtaining, by the processing circuitry, at least one instance of test data, the at least one instance of test data (a) comprising one or more words, (b) having a syntax, and (c) having a semantic meaning; based at least in part on the at least one potential trigger token and the at least one instance of test data, determining, by the processing circuitry, at least one modification trigger; determining, by the processing circuitry, one or more modifying tokens corresponding to the at least one modification trigger; and generating, by the processing circuitry, one or more instances of modified test data. Each modified instances of test data is generated by identifying a location of the at least one modification trigger within the at least one instance of test data, and generating a new instance of modified test data which is the instance of test data modified at the location of the at least one modification trigger by one of the one or more modifying tokens corresponding to the at least one modification trigger. The method further comprises providing, by the processing circuitry, the at least one instance of test data and the one or more instances of modified test data as input to the first NLP model; for each of the at least one instance of test data and the one or more instances of modified test data provided as input to the first NLP model, obtaining, by the processing circuitry, a corresponding output from the first NLP model; determining, by the processing circuitry, which of the one or more instances of modified test data provided as input to the first NLP model correspond to an output that does not satisfy a similarity criteria with respect to the output corresponding to the corresponding instance of test data; determining, by the processing circuitry, robustness information for the first NLP model based at least in part on which of the one or more instances of modified test data correspond to an output that does not satisfy a similarity criteria with respect to the output corresponding to the corresponding instance of test data; and causing, by the processing circuitry, the robustness information for the first NLP model to be provided.

According to another aspect, an apparatus (e.g., system computing device) for determining robustness information for an NLP model is provided. In an example embodiment, the apparatus comprises processing circuitry (e.g., one or more processors, NLP model circuitry, and/or attack circuitry). In an example embodiment, the processing circuitry is configured to identify at least one potential trigger token by search an embedding space of a first NLP model based at least in part on a loss function for the first NLP model; obtain at least one instance of test data, the at least one instance of test data (a) comprising one or more words, (b) having a syntax, and (c) having a semantic meaning; based at least in part on the at least one potential trigger token and the at least one instance of test data, determine at least one modification trigger; determine one or more modifying tokens corresponding to the at least one modification trigger; generate one or more instances of modified test data. The processing circuitry is configured to generate each modified instances of test data by identifying a location of the at least one modification trigger within the at least one instance of test data, and generating a new instance of modified test data which is the instance of test data modified at the location of the at least one modification trigger by one of the one or more modifying tokens corresponding to the at least one modification trigger. The processing circuitry is further configured to provide the at least one instance of test data and the one or more instances of modified test data as input to the first NLP model; for each of the at least one instance of test data and the one or more instances of modified test data provided as input to the first NLP model, obtain a corresponding output from the first NLP model; determine which of the one or more instances of modified test data provided as input to the first NLP model correspond to an output that does not satisfy a similarity criteria with respect to the output corresponding to the corresponding instance of test data; determine robustness information for the first NLP model based at least in part on which of the one or more instances of modified test data correspond to an output that does not satisfy a similarity criteria with respect to the output corresponding to the corresponding instance of test data; and cause the robustness information for the first NLP model to be provided.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

DETAILED DESCRIPTION

Figure 1:
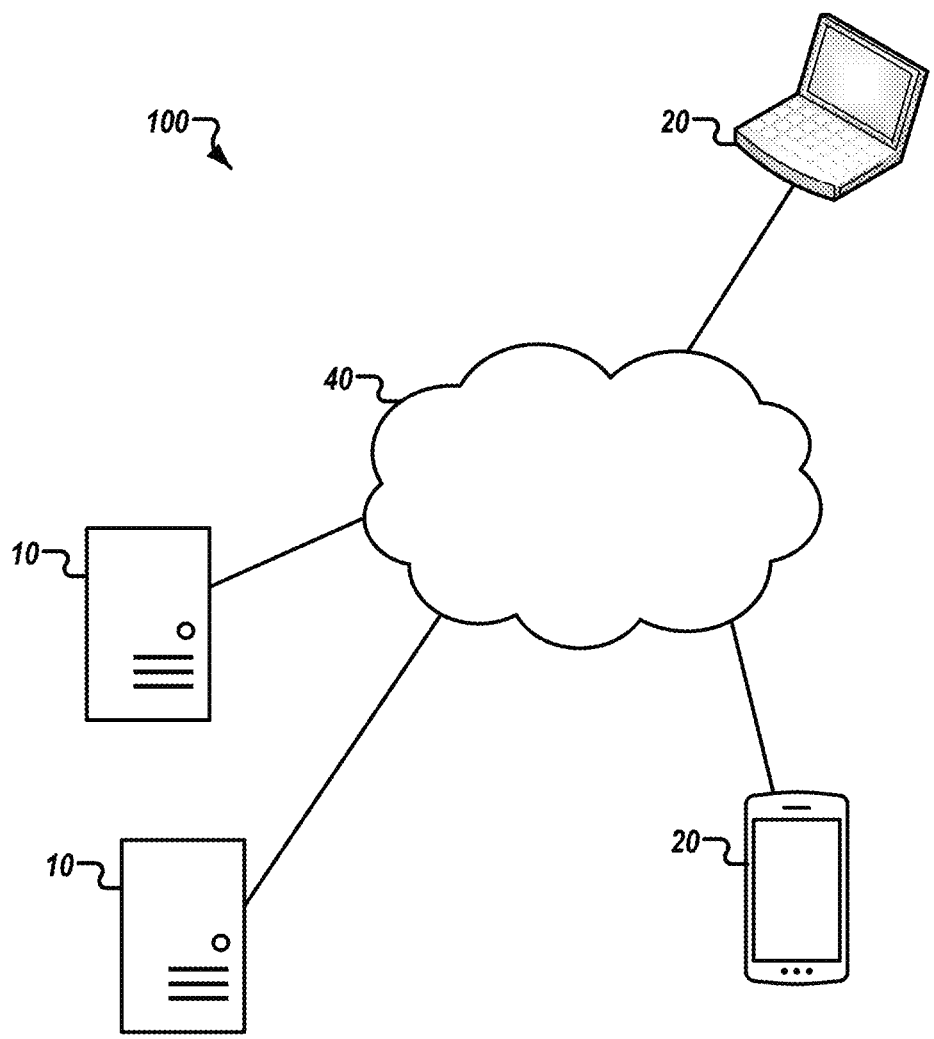
FIG. 1 is a block diagram showing an example architecture of one embodiment described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Where the specification states that a particular component or feature "may," "can," "could," "should," "would," "preferably," "possibly," "typically," "optionally," "for example," "often," "exemplary," or "might" (or other such language) be included or have a characteristic, that particular component or feature is not required to be included or to have the characteristic. Such terminology is intended to convey that the particular component or feature is included in some embodiments while excluded in others, or has the characteristic in some embodiments while lacking the characteristic in others.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessary to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) an application hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

Overview

Various embodiments provide methods, systems, apparatuses, and/or computer program products for determining the robustness of an NLP model, such as a text classification NLP model. For example, various embodiments provide methods, systems, apparatuses, and/or computer program products for preparing white box and/or black box attacks or tests of one or more NLP models and analysing the results of the attacks or tests to determine information regarding the robustness of the NLP model. Various embodiments provide an interactive user interface (IUI) through which a user may request a white box and/or black box attack or test be performed on one or more NLP models and/or review the results of white box and/or black box attack or test be performed on one or more NLP models, such as information regarding the robustness of the one or more NLP models. In various embodiments, based on the information regarding the robustness of an NLP model, an expanded set of training data may be generated, and the NLP model may be further trained and/or re-trained to increase the robustness of the NLP model.

In various embodiments, an NLP model may be configured to receive text as an input. Each word and/or term of the input text may be mapped to a vector within a multidimensional embedding space. The relationships between various vectors within the embedding space correspond to the relationships between the corresponding words or terms. The embedding vectors corresponding to each word or term may be generated or learned during the training process of the NLP model (e.g., using a machine learning algorithm or technique). The embedding vectors corresponding to each word or term may be taken from an independent word embedding (e.g., Global Vectors for Word Representation (GloVe) and/or the like). The training process includes generating a model prediction based on input text represented by one or more embedding vectors within the embedding space and comparing the model prediction to a training label associated with the input text and iteratively adjusting weights of the NLP model to minimize a loss function. The NLP model may learn to perform one or more functions or determinations based on the embedding vectors corresponding to text provided as input to the NLP model. For example, the NLP model may be a classifier and be configured to determine a class that corresponding to an input text. For example, an NLP model may be trained and/or configured to determine whether a text provided as input to the NLP model conveys a positive, neutral, or negative message. Once an NLP model has been trained, the robustness of the NLP model may be determined using one or more white or black box attacks or tests of the present disclosure.

In various embodiments, one or more white box attacks may be performed on one or more first NLP models. In various embodiments, one or more first NLP models may be analysed to identify potential trigger tokens. For example, the embedding space of a first NLP model may be searched to identify tokens within the embedding space for which the gradient of the loss function of the first NLP model is high (e.g., a local maximum, greater than a threshold percentage of the gradient loss function values within the embedding space of the NLP model, and/or the like). Based on the potential trigger tokens, modifying tokens and corresponding modification triggers may be determined for one or more instances of test data. For example, each instance of test data may comprise text, such as a comment, message, sentence(s), and/or the like. One or more instances of modified test data may be generated by modifying an instance of test data at the position of a modification trigger with one or more modifying tokens. For example, a word or term may be injected into to the instance of test data based on a modification trigger to generate an instance of modified test data. In another example, a word or term may be replaced in the instances of test data based on a modification trigger to generate an instance of modified test data. In various embodiments, an instance of modified test data maintains the syntax and semantic meaning of the corresponding instance of test data. The instance of test data and the instance(s) of modified test data may be provided to the first NLP model to determine if the output generated by the first NLP model responsive to receiving the instance of test data as input is the same and/or similar to the output generated by the first NLP model responsive to receiving a corresponding instance of modified test data. Attack results and robustness information for the first NLP model may be determined based on the output of the first NLP model. The attack results and/or robustness information for the first NLP model may be stored in memory, provided via an IUI for user review, used to aid in further training or re-training the first NLP model to improve the robustness of the first NLP model, and/or the like.

By performing one or more white box attacks on one or more first NLP models, modifying tokens and corresponding modification triggers that are effective indicators of NLP model robustness may be determined and used to generate a set of effective attack rules. A black box attack may then be performed on one or more second NLP models by using the set of effective attack rules to generate one or more instances of modified test data based on corresponding instances of test data. The instances of modified test data and the corresponding instances of test data may be provided to the second NLP model and the output of the second NLP model, responsive to receiving the instances of modified test data and the corresponding instances of test data as input, may be obtained, analyzed, and used to determine attack results and/or robustness information for the second NLP model. The attack results and/or robustness information for the second NLP model may be stored in memory, provided via an IUI for user review, used to aid in further training or re-training the second NLP model to improve the robustness of the second NLP model, and/or the like.

Accordingly, the present disclosure sets forth systems, methods, apparatuses, and computer program products that perform one or more white box and/or black box attacks on one or more NLP models to determine robustness information for the NLP models. In various instances, the robustness information may include an robustness score for the corresponding NLP model, and indication of how the robustness of the corresponding NLP model may be improved (e.g., via further training and/or re-training), and/or the like. There are many advantages of these and other embodiments described herein. For instance, NLP models are used to perform a variety of tasks (e.g., text classification of comments, monitoring message streams to try to identify ill-intentioned actors, and/or the like). However, the robustness of the NLP models is hard to determine a priori. For example, it is difficult to determine how sensitive or non-sensitive an NLP model is a perturbation in the input text. Various embodiments of the present disclosure provide the advantage of computationally efficiently and effectively determining the robustness of both white box and black box NLP models. Such determinations enable selection of more robust NLP models and/or improvement in NLP models to generate more robust NLP models. As should be understood, various embodiments are described herein for determining and providing robustness information for one or more NLP models, such as text classification NLP models. However, various embodiments may be used to determine and/or improve the robustness of various deep neural networks and/or machine-learning trained models.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment 100 within which embodiments of the present disclosure may operate to determine and provide robustness information for one or more NLP models. As illustrated, the example embodiment 100 may include one or more system computing devices 10 and one or more user computing devices 20. The one or more system computing devices and/or one or more user computing devices 20 may be in electronic communication with, for example, one another over the same or different wireless or wired networks 40. For example, a user computing device 20 may provide (e.g., transmit, submit, and/or the like) a request for robustness information for an NLP model to be determined to a system computing device 10 via one or more wireless or wired networks 40. For example, a system computing device may provide (e.g., transmit) robustness information regarding an NLP model to a user computing entity 20 via one or more wireless or wired networks 40.

Figure 2:
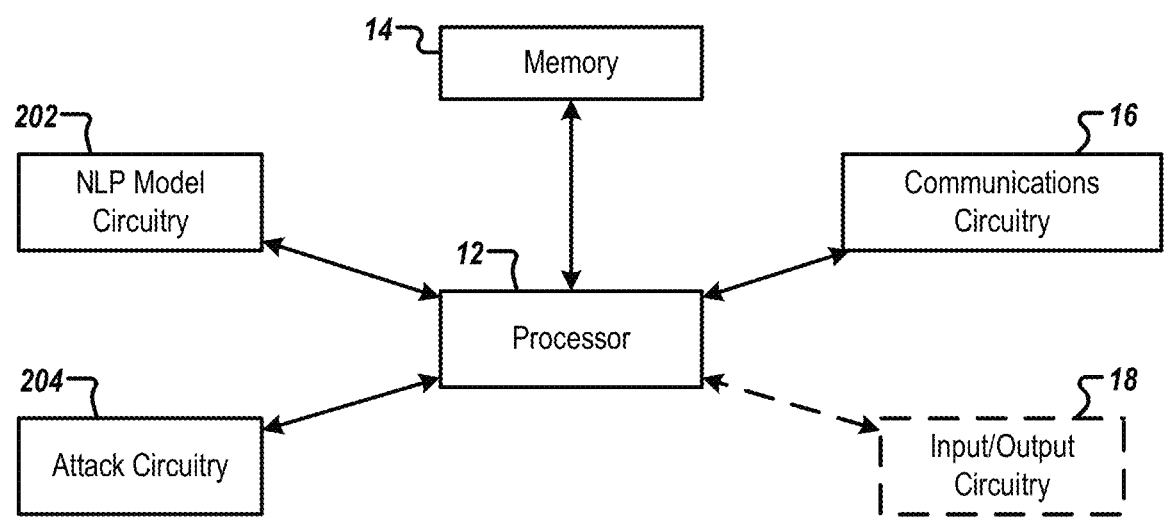
FIG. 2 is a block diagram of a system computing entity that may be specifically configured in accordance with an example embodiment described herein.

The one or more system computing devices 10 may be embodied as one or more servers, such as that described below in connection with FIG. 2. The one or more system computing devices 10 may further be implemented as local servers, remote servers, cloud-based servers (e.g., cloud utilities), or any combination thereof. The one or more system computing devices 10 may receive, process, generate, and transmit data, signals, and electronic information to facilitate the operations of determining and providing robustness information for an NLP model and/or improving the robustness of an NLP model. In various embodiments, a system computing device 10 may store and/or be in communication with one or more databases. In an example embodiment, the one or more databases may be embodied as one or more data storage devices, such as a Network Attached Storage (NAS) device or devices, or as one or more separate databases or servers. The one or more databases may store information accessed by the system computing device 10 to facilitate the operations of determining and providing robustness information for an NLP model and/or improving the robustness of an NLP model. For example, the one or more databases may store control signals, device characteristics, and access credentials for one or more of the user computing devices 20.

Figure 3:
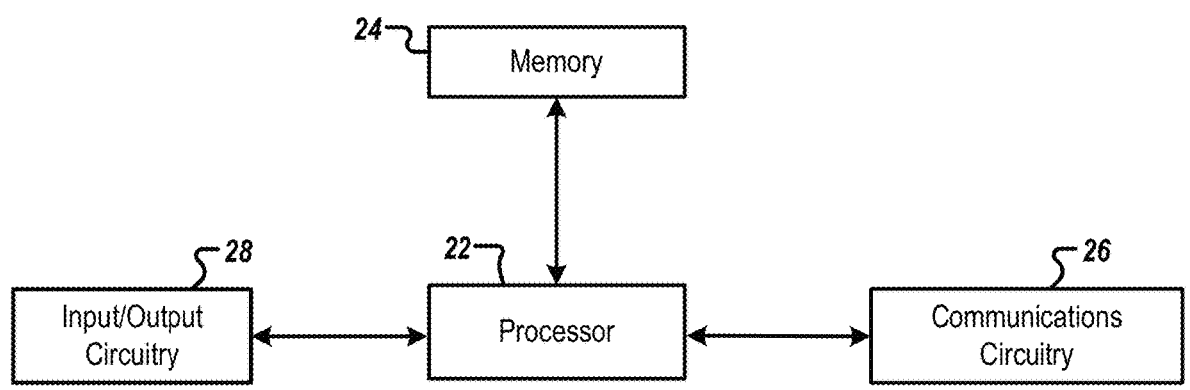
FIG. 3 is a block diagram of a user computing entity that may be specifically configured in accordance with an example embodiment described herein.

The one or more user computing devices 20 may be embodied by any computing devices known in the art, such as those described below in connection with FIG. 3. The system computing device 10 may receive information from, and transmit information to, the one or more user computing devices 20. For example, the system computing device 10 may receive a request for robustness information for an NLP model generated and provided by a user computing device 20. For example, the system computing device may provide robustness information for an NLP model such that a user computing device 20 receives the robustness information. It will be understood that in some embodiments, the one or more user computing devices 20 need not themselves be independent devices, but may be peripheral devices communicatively coupled to other computing devices.

Exemplary Computing Devices

The system computing device 10 described with reference to FIG. 1 may be embodied by one or more computing devices or servers, such as the example system computing device 10 shown in FIG. 2. As illustrated in FIG. 2, the system computing device 10 may include processing circuitry 12, memory 14, communications circuitry 16, input-output circuitry 18, NLP model circuitry 202, and attack circuitry 204, each of which will be described in greater detail below. In some embodiments, the system computing device 10 may further comprise a bus (not expressly shown in FIG. 2) for passing information between various components of the system computing device. The system computing device 10 may be configured to execute various operations described above in connection with FIG. 1 and below in connection with FIGS. 4-8.

In some embodiments, the processor 12 (and/or co-processor or any other processing circuitry assisting or otherwise associated with the processor) may be in communication with the memory 14 via a bus for passing information among components of the apparatus. The processor 12 may be embodied in a number of different ways and may, for example, include one or more processing devices configured to perform independently. Additionally or alternatively, the processor may include one or more processors configured in tandem via a bus to enable independent execution of software instructions, pipelining, and/or multithreading. The use of the terms "processor" or "processing circuitry" may be understood to include a single core processor, a multi-core processor, multiple processors of the system computing device 10, remote or "cloud" processors, or any combination thereof.

In an example embodiment, the processor 12 may be configured to execute software instructions stored in the memory 14 or otherwise accessible to the processor. Alternatively or additionally, the processor 12 may be configured to execute hard-coded functionality. As such, whether configured by hardware or software methods, or by a combination of hardware with software, the processor 12 may represent an entity (e.g., physically embodied in circuitry) capable of performing operations according to an embodiment of the present invention while configured accordingly.

Alternatively, as another example, when the processor 12 is embodied as an executor of software instructions, the software instructions may specifically configure the processor 12 to perform the algorithms and/or operations described herein when the software instructions are executed.

Memory 14 is non-transitory and may include, for example, one or more volatile and/or non-volatile memories. In other words, for example, the memory 14 may be an electronic storage device (e.g., a computer readable storage medium). The memory 14 may be configured to store information, data, content, applications, software instructions, or the like, for enabling the apparatus to carry out various functions in accordance with example embodiments contemplated herein.

The communications circuitry 16 may be any means such as a device or circuitry embodied in either hardware or a combination of hardware and software that is configured to receive and/or transmit data from/to a network and/or any other device, circuitry, or module in communication with the system computing device 10. In this regard, the communications circuitry 16 may include, for example, a network interface for enabling communications with a wired or wireless communication network. For example, the communications circuitry 16 may include one or more network interface cards, antennas, buses, switches, routers, modems, and supporting hardware and/or software, or any other device suitable for enabling communications via a network 40. Additionally or alternatively, the communication interface 16 may include the circuitry for causing transmission of such signals to a network or to handle receipt of signals received from a network.

In some embodiments, the system computing device 10 may include input/output circuitry 18 in communication configured to provide output to a user and, in some embodiments, to receive an indication of user input. The input/output circuitry 18 may comprise a user interface, such as a display, and may further comprise the components that govern use of the user interface, such as a web browser, mobile application, dedicated client device, or the like. In some embodiments, the input/output circuitry 18 may additionally or alternatively include a keyboard, a mouse, a touch screen, touch areas, soft keys, a microphone, a speaker, and/or other input/output mechanisms or devices. The input/output circuitry 18 may utilize the processor 12 to control one or more functions of one or more of these user interface elements through software instructions (e.g., application software and/or system software, such as firmware) stored on a memory (e.g., memory 14) accessible to the processor 12.

In addition, the system computing device 10 further comprises NLP model circuitry 202, which includes hardware components designed for acting as an NLP model. The NLP model circuitry 202 may utilize processor 12, memory 14, or any other hardware component included in the system computing device 10 operate and/or execute an NLP model, as described in connection with FIGS. 4-8 below. The NLP model circuitry 202 may further utilize communications circuitry 16 to receive input instances of text, or may otherwise utilize processor 12 and/or memory 14 to access information/data and/or executable instructions (e.g., software) used to execute and/or operate an NLP model and/or the like. In an example embodiment, the functionality described herein as being performed by the NLP model circuitry 202 is performed through the execution executable instructions by the processor 12. In an example embodiment, the NLP model circuitry 202 comprises one or more graphical processing units (GPUs).

In addition, the system computing device 10 further comprises attack circuitry 204, which includes hardware components generating instances of modified test data, providing instances of test data and corresponding instances of modified test data as input to an NLP model, receiving output from the NLP model, analyzing the output obtained from the NLP model, and/or the like. The attack circuitry 204 may utilize processor 12, memory 14, or any other hardware component included in the system computing device 10 to perform these operations, as described in connection with FIGS. 4-8 below. The attack circuitry 204 may further utilize processor 12 and/or memory 14 to generating instances of modified test data, providing instances of test data and corresponding instances of modified test data as input to an NLP model, receiving output from the NLP model, analyzing the output obtained from the NLP model, and/or the like. In an example embodiment, the functionality described herein as being performed by the attack circuitry 204 is performed through the execution executable instructions by the processor 12. In an example embodiment, the attack circuitry 204 comprises one or more graphical processing units (GPUs).

Although these components 12-18 and 202-204 may in part be described using functional language, it will be understood that the particular implementations necessarily include the use of particular hardware. It should also be understood that certain of these components 12-18 and 202-204 may include similar or common hardware. For example, the NLP model circuitry 202 and attack circuitry 204 may each at times leverage use of the processor 12 or memory 14, but duplicate hardware is not required to facilitate operation of these distinct components of the system computing device 10 (although duplicated hardware components may be used in some embodiments, such as those in which enhanced parallelism may be desired). The use of the term "circuitry" as used herein with respect to components of the system computing device 10 therefore shall be interpreted as including the particular hardware configured to perform the functions associated with the particular circuitry described herein. Of course, while the term "circuitry" should be understood broadly to include hardware, in some embodiments, the term "circuitry" may refer also to software instructions that configure the hardware components of the model computing entity 10 to perform their various functions.

To this end, each of the communications circuitry 16, input/output circuitry 18, NLP model circuitry 202 and attack circuitry 204 may include one or more dedicated processors, specially configured field programmable gate arrays (FPGA), and/or application specific interface circuit (ASIC) to perform its corresponding functions, these components may additionally or alternatively be implemented using a processor (e.g., processor 12) executing software stored in a memory (e.g., memory 14). In this fashion, the communications circuitry 16, input/output circuitry 18, solver circuitry 202, and DNN circuitry 204 are therefore implemented using special-purpose components implemented purely via hardware design or may utilize hardware components of the system computing device 10 that execute computer software designed to facilitate performance of the functions of the communications circuitry 16, input/output circuitry 18, NLP model circuitry 202, and attack circuitry 204.

The user computing device 20 described with reference to FIG. 1 may be embodied by one or more computing devices, personal computers, desktop computers, client devices (e.g., of the system computing device 10), and/or mobile devices, such as the example user computing device 20 shown in FIG. 3. The illustrated example user computing device 20 includes processing circuitry and/or processor 22, memory 24, communications circuitry 26, and input-output circuitry 28, each of which is configured to be similar to the similarly named components described above in connection with FIG. 2. In various embodiments, the processor 22, memory 24, and input-output circuitry 28 are configured to provide an IUI configured for user interaction (e.g., via the input-output circuitry 28). For example, the IUI may be configured to receive user input initiating one or more white box and/or black box attacks to determine the robustness of first and/or second NLP models and/or to provide robustness information regarding the first and/or second NLP models.

In some embodiments, various components of the system computing device 10 and/or user computing device 20 may be hosted remotely (e.g., by one or more cloud servers) and thus need not physically reside on the corresponding computing device 10, 20. Thus, some or all of the functionality described herein may be provided by third party circuitry. For example, a given computing device 10, 20 may access one or more third party circuitries via any sort of networked connection that facilitates transmission of data and electronic information between the computing device 10, 20 and the third party circuitries. In turn, that computing device 10, 20 may be in remote communication with one or more of the other components describe above as comprising the computing device 10, 20.

As will be appreciated based on this disclosure, example embodiments contemplated herein may be implemented by a system computing device 10 and/or user computing device 20. Furthermore, embodiments may take the form of a computer program product on at least one non-transitory computer-readable storage medium (e.g., memory 14, 24) storing software instructions. Any suitable non-transitory computer-readable storage medium may be utilized, some examples of which are non-transitory hard disks, CD-ROMs, flash memory, optical storage devices, and magnetic storage devices. It should be appreciated, with respect to certain system computing devices 10 as described in FIG. 2 or user computing devices 20 as described in FIG. 3, that loading the software instructions onto a computer or apparatus produces a special-purpose machine comprising the means for implementing various functions described herein.

Having described specific components of example system computing devices 10 and user computing devices 20, example embodiments are described below in connection with FIGS. 4-9.

Example Operation of a System Computing Device

In various embodiments, one or more white box and/or black box attacks or tests of one or more NLP models may be performed to determine robustness information regarding the one or more NLP models. The robustness information may then be provided for storage, provided via an IUI for user review, and/or used to improve the robustness of the one or more NLP models (e.g., via further training, re-training, and/or the like).

In various embodiments, one or more white box attacks may be performed on one or more first NLP models. For example, a first NLP model is an NLP model for which information regarding the model is known (e.g., the loss function, the embedding space of the model, the gradient of the loss function for various locations within the embedding space, and/or the like). In various embodiments, one or more first NLP models may be analysed to identify potential trigger tokens. For example, the embedding space of a first NLP model may be searched to identify tokens within the embedding space for which the gradient of the loss function of the first NLP model is high (e.g., a local maximum, greater than a threshold percentage of the gradient loss function values within the embedding space of the NLP model, and/or the like).

Based on the potential trigger tokens, modifying tokens and corresponding modification triggers may be determined for one or more instances of test data. For example, each instance of test data may comprise text, such as a comment, message, sentence(s), and/or the like. One or more instances of modified test data may be generated by modifying an instance of test data at the position of a modification trigger with one or more modifying tokens. For example, a word or term may be injected into to the instance of test data based on a modification trigger to generate an instance of modified test data. In another example, a word or term may be replaced in the instances of test data based on a modification trigger to generate an instance of modified test data. In various embodiments, an instance of modified test data maintains the syntax and semantic meaning of the corresponding instance of test data.

The instance of test data and the instance(s) of modified test data may be provided to the first NLP model to determine if the output generated by the first NLP model responsive to receiving the instance of test data as input is the same and/or similar to the output generated by the first NLP model responsive to receiving a corresponding instance of modified test data. Attack results and robustness information for the first NLP model may be determined based on the output of the first NLP model. The attack results and/or robustness information for the first NLP model may be stored in memory, provided via an IUI for user review, used to aid in further training or re-training the first NLP model to improve the robustness of the first NLP model, and/or the like.

By performing one or more white box attacks on one or more first NLP models, modifying tokens and corresponding modification triggers that are effective indicators of NLP model robustness may be determined and used to generate a set of effective attack rules. A black box attack may then be performed on one or more second NLP models by using the set of effective attack rules to generate one or more instances of modified test data based on corresponding instances of test data. For example, a second NLP model is an NLP model for which model information (e.g., the loss function, the gradient of the loss function at various points within the embedding space, and/or the like) regarding the model is not known/available or is not used in preparing the attack. For example, the second NLP model may be an NLP that was trained, generated, and/or the like by a third party. For example, a second NLP model may be part of a line-of-business (LOB) platform, system, software, and/or the like. The generated instances of modified test data and the corresponding instances of test data may be provided to the second NLP model and the output of the second NLP model, responsive to receiving the instances of modified test data and the corresponding instances of test data as input, may be obtained, analyzed, and used to determine attack results and/or robustness information for the second NLP model. The attack results and/or robustness information for the second NLP model may be stored in memory, provided via an IUI for user review, used to aid in further training or re-training the second NLP model to improve the robustness of the second NLP model, and/or the like.

A. Determining and Providing Robustness Information for a First NLP Model

Figure 4:
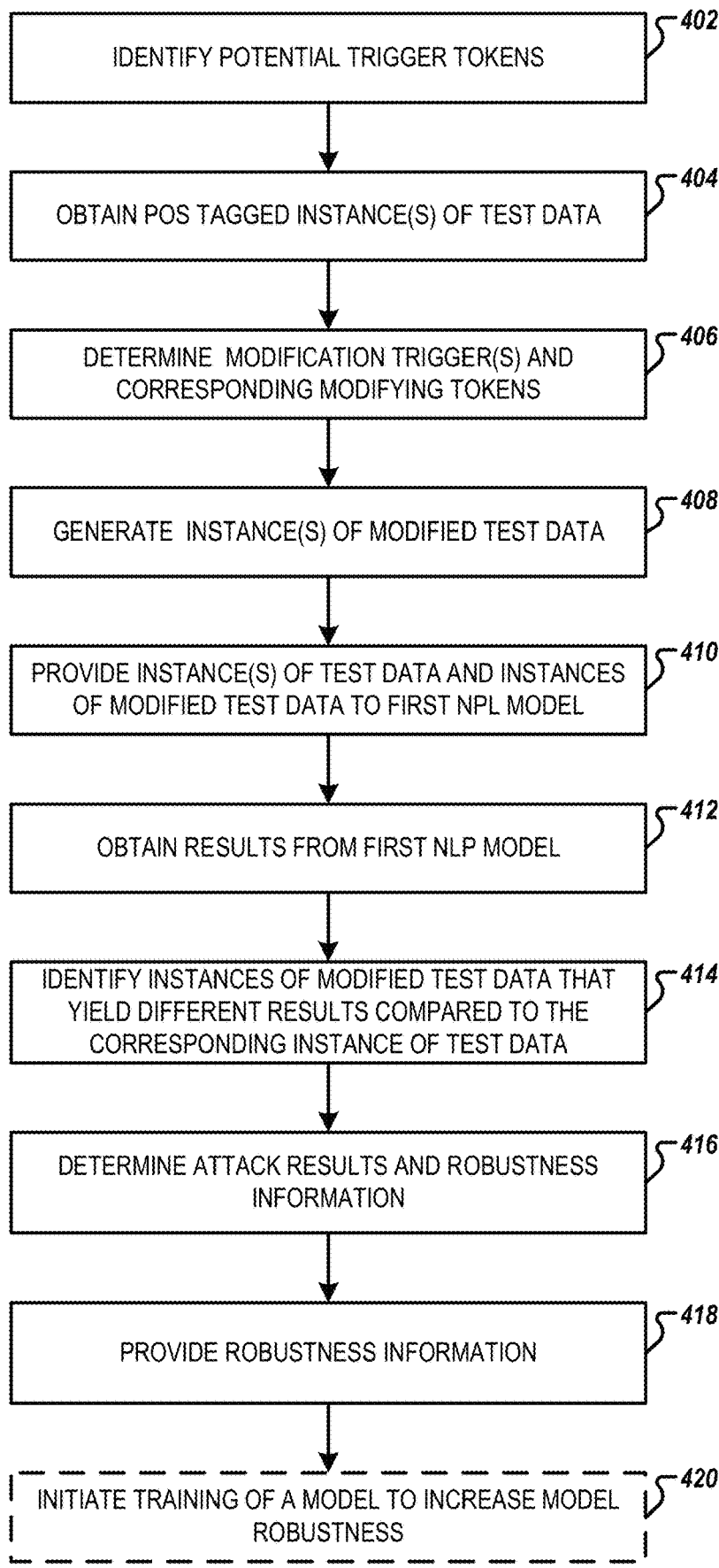
FIG. 4 is a flowchart illustrating operations performed, such as by the system computing entity of FIG. 2, to perform a white box attack of a first NLP model, in accordance with an example embodiment described herein.

FIG. 4 provides a flowchart illustrating various processes, procedures, operations, and/or the like that may be performed by a system computing device 10, for example, to determine and provide robustness information for a first NLP model. For example, a white box attack or test of a first NLP model may be performed to determine robustness information for a first NLP model.

In various embodiments, the white box attack or test of the first NLP model may be performed responsive to a request for robustness information for the first NLP model being received (e.g., by the system computing device 10). In an example embodiment, the white box attack or test of the first NLP model may be performed responsive to a request for the generation of a set of rules that may be used to perform a black box attack or test of a second NLP model being received (e.g., by the system computing device 10). In an example embodiment, a user may operate a user computing entity 20 (e.g., via input/output circuitry 28) and provide input indicating a request for validation of the first NLP model or a second NLP model be performed. The user computing entity 20 may, responsive thereto, generate a request for attack results and/or robustness information for a first NLP model (e.g., generated based on a white box attack or test of the first NLP model) and/or for a second NLP model (e.g., generated based on a black box attack or test of a second NLP model). The user computing entity 20 may provide the request such that the system computing device 10 receives the request and performs a white box attack and/or test of the first NLP model. In an example embodiment, the request is provided as an application program interface (API) call. For example, a validation process and/or application operating on and/or providing an IUI via the user computing device 20 may generate the request and provide the request to be provided such that the system computing device 10 receives the request.

Starting at block 402, potential trigger tokens are identified. For example, the system computing device 10 may identify potential trigger tokens for the first NLP model. For example, the system computing device 10 may comprise means, such as processor 12, memory 14, NLP model circuitry 202, attack circuitry 204, and/or the like, for identifying potential trigger tokens for the first NLP model. For example, potential trigger tokens are words or terms within the embedding space of the first NLP model that are good candidates for modification triggers. In various embodiments, instances of modified test data are generated by modifying an instance of test data at a position of a modification trigger. In various embodiments, information/data regarding the first NLP model may be used to identify the potential trigger tokens. For example, the loss function and/or a gradient of the loss function may be evaluated at one or more locations within the embedding space of the first NLP model to determine and/or identify potential trigger tokens for the first NLP model.

At block 404, one or more parts-of-speech (POS)-tagged instances of test data are obtained. For example, the system computing device 10 may receive, access, and/or otherwise obtain one or more POS-tagged instances of test data. For example, the system computing device 10 may comprise means, such as processor 12, memory 14, communications circuitry 16, attack circuitry 204, and/or the like, for obtaining one or more POS-tagged instances of test data. A POS-tagged instance of test data is a set of text (e.g., words, terms, sentences, comments, messages, and/or the like) where each word or term of the text is tagged with the corresponding part of speech (e.g., noun, verb, adjective, adverb, pronoun, conjunction, preposition, interjection). For example, each word or term of an instance of test data may be associated with a tag that indicates the part of speech of the word or term. In an example embodiment, the instance of test data is received, accessed, and/or the like; analyzed to determine the part of speech of each word or term of the instance of test data; and is tagged with the determined part of speech. In an example embodiment, the instance of test data comprises and/or is associated with POS tags when the instance of test data is received, accessed, and/or otherwise obtained. In various embodiments, an instance of test data conveys a semantic meaning and is structured in accordance with a syntax. For example, the instance of test data may be structured in accordance with the syntax of the language corresponding to the words or terms of the instance of test data.

At block 406, modification triggers and corresponding modifying tokens are determined. For example, the system computing device 10 may determine modification triggers and corresponding modifying tokens for the one or more instances of test data. For example, the system computing device 10 may comprise means, such as such as processor 12, memory 14, attack circuitry 204, and/or the like, for determining modification triggers and corresponding modifying tokens. For example, it may be determined which of the potential trigger tokens are present in the one or more instances of test data. The potential trigger tokens that are determined to be present in the one or more instances of test data may be identified as the modification triggers for the present attack or test of the first NLP model. For each modification trigger, one or more modifying tokens may be determined and/or identified. For example, a modification trigger may be a replacement trigger token group and the modifying tokens may be words, terms, phrases, and/or the like that the replacement trigger token group is replaced with to form an instance of modified test data. For example, a modification trigger may be an insertion trigger token and the modifying tokens may be words, terms, phrases, and/or the like that are inserted into the instance of test data at a set position relative to the insertion trigger token.

Figure 5:
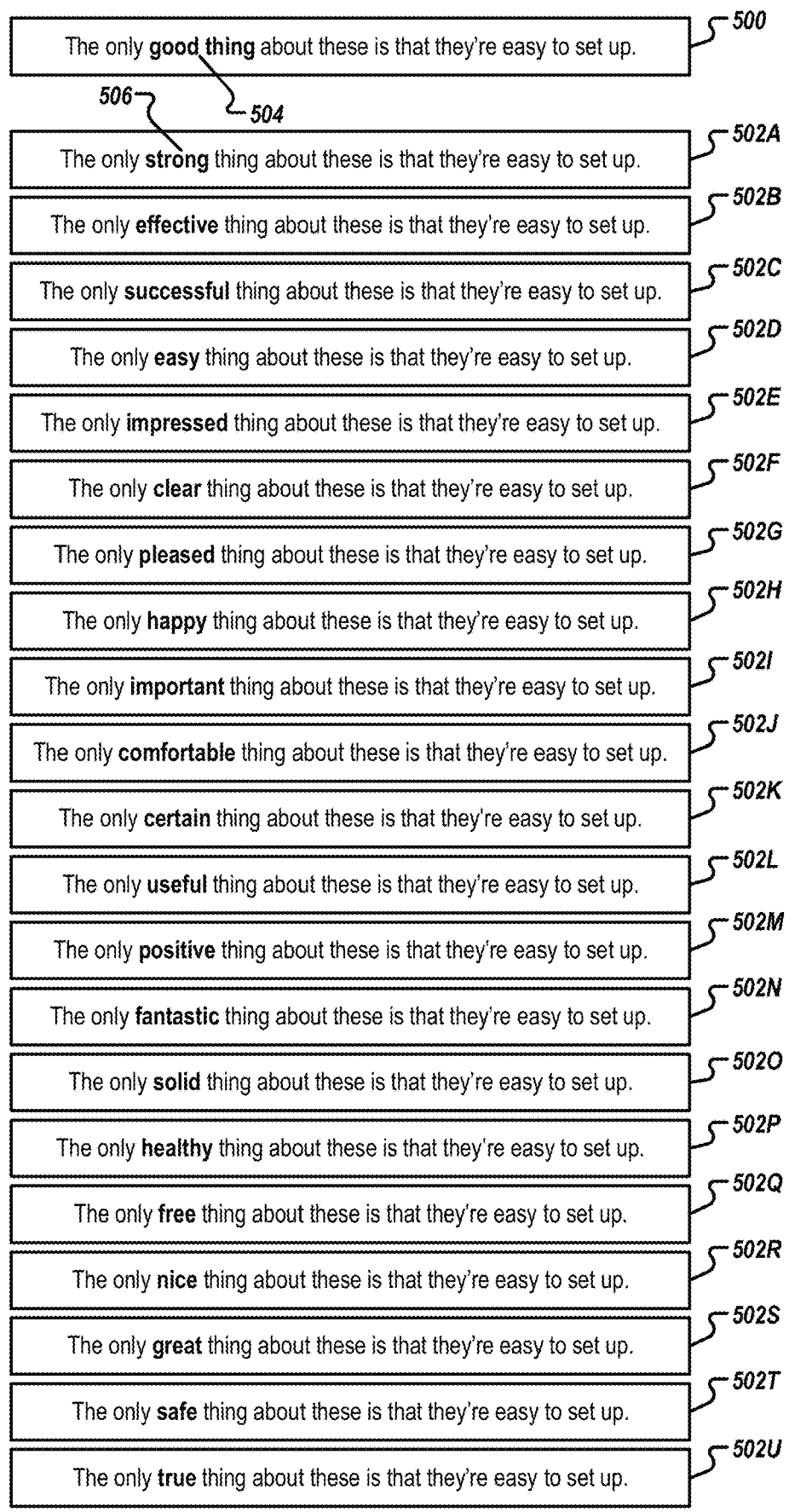
FIG. 5 illustrates an example instance of test data and corresponding instances of modified test data, in accordance with an example embodiment described herein.

For example, in an example embodiment, when the word "good" is present in an adjective-noun pair (e.g., "good noun"), the adjective-noun pair may be identified as a replacement trigger token group based on the "good" being a potential trigger token and the words "strong," "effective," "successful," "easy," "impressed," "clear," "pleased," "happy," "important," "comfortable," "certain," "useful," "positive," "fantastic," "solid," "healthy," "free," "nice," "great," "safe," and "true" may be determined and/or identified as modifying tokens that may be used to replace the word "good" in the adjective-noun pair to form an instance of modified test data based on synonyms and/or words similar to the word "good" that are within the vocabulary and/or embedding space of the first NLP model. For example, FIG. 5 illustrates an example instance of test data 500 and a plurality of instances of modified test data 502A-U where the at least one token of the replacement trigger token group 504 has been replaced by a modifying token group (e.g., replacement token group 506).

In various embodiments, the modification trigger token may be a group of tokens and/or a combination of tokens and syntactical structures (e.g., adjective-noun pairs and/or other groupings). In various embodiments, the modifying tokens may include a single token that is inserted into and/or used to replace a token in the instance of test data or may include multiple tokens (e.g., a phrase) that is inserted into and/or used to replace a token or group of tokens (e.g., a word or phrase) in the instance of test data to form an instance of modified test data. In various embodiments, the modification trigger and modifying tokens (and the set relative position in the case of an insertion token/insertion trigger token) are configured to maintain the syntax of an instance of test data.

Continuing with FIG. 4, at block 408, one or more instances of modified test data are generated. For example, the system computing device 10 may generate one or more instances of modified test data. For example, the system computing device 10 may comprise means, such as processor 12, memory 14, attack circuitry 204, and/or the like, for generating one or more instances of modified test data. For example, based on the determined modification triggers and modifying tokens, one or more instances of test data may be analyzed and used as a basis for generating one or more corresponding instances of modified test data. For example, an instance of modified test data may be generated by identifying one or more modification triggers within an instance of test data and generating a new instance of modified test data within which one or more tokens has been modified based on the identified modification trigger(s) and modifying tokens. For example, a new instance of modified test data may be generated by replacing one or more tokens within an instance of test data based on one or more replacement trigger token groups and corresponding replacement token groups. For example, new instance of modified test data 502A is generated by replacing the token "good" from the replacement trigger token group "good thing" corresponding to the syntactical structure "good noun" with a replacement token "strong." In another example, a new instance of modified test data is generated by inserting an insertion token into the set relative position corresponding to an insertion trigger token. For example, the instance of test data "The only thing about these is that they're easy to set up" may be modified to form the instance of modified test data "The only fantastic thing about these is that they're easy to set up." As used herein, an instance of test data and an instance of modified test data correspond to one another when the instance of modified test data was generated from and/or based at least in part on the instance of test data.

In an example embodiment, the generated instances of modified test data may be filtered to exclude instances of modified test data that do not maintain the semantic meaning and/or syntax of the corresponding instance of test data. For example, for the instances of modified test data 502A-U shown in FIG. 5, instances of modified test data 502A, 502B, 502E, 502F, 502G, 502I, 502J, 502K, 502L, 502O, 502P, 502Q, 502T, and 502U may be filtered out as not maintaining the semantic meaning of the corresponding instance of test data 500. The at least some of the remaining instances of modified test data (e.g., 502C, 502D, 502H, 502M, 502N, 502R, and 502S) may be used at block 410 of FIG. 4.

At block 410, one or more instances of test data and one or more corresponding instances of modified test data are provided as input to the first NLP model. For example, the system computing device 10 may provide one or more instances of test data and one or more corresponding instances of modified test data to an input layer of the first NLP model. For example, the system computing device 10 may comprise means, such as processor 12, memory 14, NLP model circuitry 202, attack circuitry 204, and/or the like, for providing one or more instances of test data and one or more corresponding instances of modified test data to an input layer of the first NLP model. For example, instances of test data and corresponding instances of modified test data may be provided to the first NLP model for analysis, classification, and/or the like by the first NLP model.

At block 412, results are obtained from the first NLP model. For example, the results of the first NLP model analyzing, classifying, and/or the like the one or more instances of test data and one or more corresponding instances of modified test data may be obtained from the output layer of the first NLP model. For example, the system computing device 10 may obtain the results of the first NLP model analyzing, classifying, and/or the like the one or more instances of test data and one or more corresponding instances of modified test data. For example, the system computing device 10 may comprise means, such as processor 12, memory 14, NLP model circuitry 202, attack circuitry 204, and/or the like, for obtaining the results of the first NLP model analyzing, classifying, and/or the like the one or more instances of test data and one or more corresponding instances of modified test data.

At block 414, instances of modified test data that yield results that are different from the results obtained based on the corresponding instance of test data are identified. For example, analyzing, classifying, and/or the like a first instance of test data may yield a first output. For example, analyzing, classifying, and/or the like instances of modified test data corresponding to the first instances of test data may yield respective second outputs. The first output and second outputs may be obtained from the first NLP model (e.g., the output layer of the first NLP model). The instances of modified test data that yield second outputs that are different from and/or not similar to the first output are identified. For example, if the first NLP model is a classifier (e.g., configured to determine a classification for an input text), a first output may be different from or not similar to a second output if the first output and the second output are different classifications. For example, if the first NLP model provides a summary or paraphrasing of an input text, it may be determined if the summary provided by the first output and the summary provided by the second output are different or not similar. For example, it may be determined whether the first output and the second output satisfy a similarity criteria. For example, in a scenario where the first NLP model is a classifier, the similarity criteria may correspond to whether the first output and the second output correspond to the same classification, or, in the instance of hierarchical classifications, whether the first output and the second output correspond to sub-classes of the same class, and/or the like. For example, in a scenario where the first NLP model returns output text generated based at least in part on an input text (e.g., instance of test data and/or instance of modified test data), a vector within the embedding space determined based on the embedding vectors corresponding to one or more words of the output text may be determined for each of the first output and the second output. The vector corresponding to the first output and the vector corresponding to the second output may be compared and/or evaluated to determine whether the two vectors are sufficiently similar to satisfy the similarity criteria (e.g., the (Euclidean, cosine, and/or other) distance between the two vectors is no greater than a threshold value). For example, the first output obtained based on an instance of test data may be compared to a second output yielded based on a corresponding instance of modified test data to determine whether the result of analyzing the instance of test data by the first NLP model is different from the result of analyzing the corresponding instance of modified test data by the first NLP model. For example, the system computing device 10 may identify instances of modified test data that yield an output from the first NLP model that is different from the output yielded from the first NLP model when the corresponding instance of test data is provided as input to the first NLP model. For example, the system computing device 10 may comprise means, such as processor 12, memory 14, NLP model circuitry 202, attack circuitry 204, and/or the like, for identifying instances of modified test data that yield an output from the first NLP model that is different from the output yielded from the first NLP model when the corresponding instance of test data is provided as input to the first NLP model.

In various embodiments, the instances of modified test data that yield a second output that is different from and/or not similar to the first output obtained based on the corresponding instance of test data are tagged as output changing instances of modified test data. In various embodiments, the modification trigger and corresponding modifying token(s) used to generate an instance of modified test data that yielded a second output that is different from and/or not similar to the first output obtained based on the corresponding instance of test data are tagged and/or identified as an output changing rule. In various embodiments, a rule (e.g., an output changing rule) comprises a modification trigger, a modifying token(s), any information needed to modify an instance of test data using the modification trigger and the modifying token(s) (e.g., a relative position for insertion of an insertion token). In various embodiments, a rule may also be associated with metadata indicating how often an instance of modified test data generated based on the rule yields a second output that is different from and/or not similar to the first output obtained based on the corresponding instance of test data and/or the like.

At block 416, based on comparisons of the first output obtained based on instances of test data and second outputs yielded based on corresponding instances of modified test data, the attack results may be determined and robustness information for the first NLP model may be determined. For example, the system computing device 10 may determine attack results and/or robustness information for the first NLP model based on comparisons of first outputs and respectively corresponding second outputs. For example, the system computing device 10 may comprise means, such as processor 12, memory 14, NLP model circuitry 202, attack circuitry 204, and/or the like, for determining attack results and/or robustness information for the first NLP model based on comparisons of first outputs and respectively corresponding second outputs.

For example, the number output changing instances of modified test data and/or percentage of instances of modified test data that were identified as being output changing instances of modified test data may be used to determine a robustness score for the first NLP model or other description or summary of the robustness of the first NLP model. For example, the attack results and/or robustness information may comprise a list of the output changing instances of modified test data and/or output changing rules identified based on the attack or test, a description and/or summary of the robustness of the first NLP model, such as a robustness score, and/or the like. For example, a robustness score may provide an indication of how robust the first NLP model is. In an example embodiment, the robustness score may provide an indication of how robust the first NLP model is in comparison to other first or second NLP models. For example, the robustness score may be numerical value, a letter grade (e.g., A, B, C, D, F, and/or the like) a brief summary of the attack results, a percentage of similar NLP models that the first NLP model performed better or worse than, a standard deviation of a measure of robustness determined for the first NLP model (e.g., based on the attack results) from an average measure of robustness for similar NLP models, and/or the like. For example, the robustness score for the first NLP model may be determined at least in part on the attack results. In an example embodiment, the attack results and/or robustness information may comprise information that may be used to improve the robustness of the first NLP model (e.g., via further training, re-training, and/or the like). For example, the attack results and/or robustness information may provide information regarding types of text that may be added to the training data used to train the first NLP model such that further training or re-training the first NLP model using the expanded training data would yield a more robust NLP model.

At block 418, the attack results and/or robustness information for the first NLP model is provided. For example, the attack results and/or robustness information may be stored in memory (e.g., memory 14), provided via an IUI (e.g., via communications circuitry 16 and input/output circuitry 28 or via input/output circuitry 18), and/or the like. For example, the attack results and/or robustness information may be provided via an IUI similar to the results IUI 1000 shown in FIG. 10. For example, system computing device 10 may provide (e.g., for storing, transmitting, display, and/or the like) and/or cause the providing (e.g., storing, display, and/or the like) at least a portion of the attack results and/or robustness information. For example, the system computing device 10 may comprise means, such as processor 12, memory 14, communication circuitry 16, input/output circuitry 18, and/or the like) for providing or causing the providing of at least a portion of the attack results and/or robustness information. In an example embodiment, the attack results and/or robustness information may be provided in an API call and/or as an API call response to a validation process and/or application. For example, if the attack was initiated by an API call from a validation process and/or application, the attack results and/or robustness information for the first NLP model may be provided via an API call response to the validation process and/or application.

In an example embodiment, the further training and/or re-training of the first NLP model may be automatically initiated, at block 420. For example, the system computing device 10 may automatically initiate further training and/or retraining of the first NLP model. For example, the system computing device 10 may comprise means, such as processor 12, memory 14, NLP model circuitry 202, attack circuitry 204, and/or the like, for automatically initiating further training and/or re-training of the first NLP model. For example, the an augmented and/or modified training set may be generated based at least in part on the attack results and/or robustness information. The augmented and/or modified training set may then be used to further train and/or re-train the first NLP model using a machine learning algorithm and/or technique (possibly the same machine learning algorithm or technique used to originally train the first NLP model).

B. Identifying Potential Trigger Tokens

Figure 6:
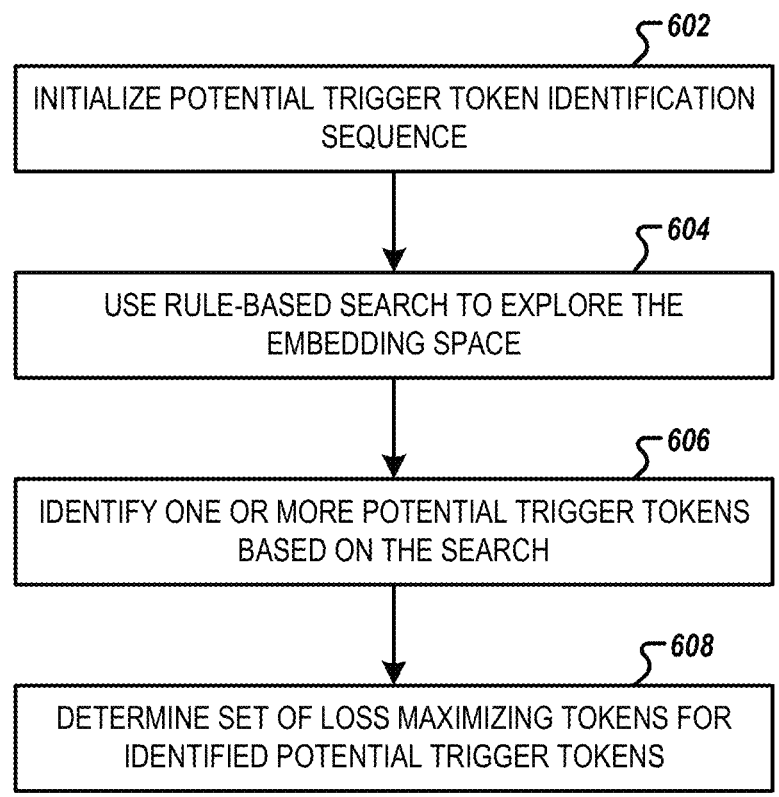
FIG. 6 is a flowchart illustrating operations performed, such as by the system computing entity of FIG. 2, to determine potential trigger tokens for a first NLP model, in accordance with an example embodiment described herein.

FIG. 6 provides a flowchart illustrating various processes, procedures, operations, and/or the like that may be performed, by a system computing device 10, for example, to identify potential trigger tokens for a first NLP model. For example, the processes, procedures, operations, and/or the like of FIG. 6 may be performed as part of block 402.

In general, the potential trigger tokens are universal triggers that are likely to cause a change in the behavior of one or more NLP models. For example, potential trigger tokens may be identified as a list of tokens that increase the overall loss function value for a test sample. For example, potential trigger tokens may be tokens within the embedding space of the first NLP model that when applied in isolation, cause the value of the loss function of the first NLP model to increase and thus indicate a potential toward changing the behavior of the model. For example, in an example embodiment, a projected gradient descent method may be used to identify the potential trigger tokens in the embedding space of the first NLP model that affect the model the most.

For example, a word $w^j$ has a word embedding $e^j$ in the first NLP model. L is the loss function of the first NLP model and $\nabla_{e^j} L$ is the projected gradient of the loss function at the position of the word embedding $e^j$ in the embedding space of the first NLP model. An iterative method may then be used in the positive gradient direction to find an appropriate word trigger based on selection criteria, subject to the constraint that the word trigger is constrained to be in the embedding space of the first NLP model (e.g., within the vocabulary known to the first NLP model). Given a vector $e_i^j$, a next embedding vector $e_{i+1}^j$ within the embedding space to be considered is found that minimizes the dot product of $(e_{i+1}^j - e_i^j)$ with the gradient of the loss function $\nabla_{e^j} L$ for the target class or maximizes if the target is just to flip or otherwise change the model decision. Thus, the dot product of $(e_{i+1}^j - e_i^j) \cdot \nabla_{e^j} L$ is minimized for a target model output (e.g., target class) when the goal is to achieve a model output corresponding to the target model output (e.g., target class) and the dot product of $(e_{i+1}^j - e_i^j) \cdot \nabla_{e^j} L$ is maximized when the aim is to flip or change the NLP model output. In an example embodiment, the steps taken in the direction of the gradient of the loss function are further constrained with an additional condition corresponding to set and/or predefined rules relating to the sequence of POS tags of the tokens. For example, it may be determined that only tokens that are associated with tags indicating that the tokens are adjectives should be identified as potential trigger tokens. In another example, it may be determined that groups of tokens having the syntactical form adjective-noun pair may be identified as potential trigger tokens. Various other additional conditions regarding the POS of tokens identified as potential trigger tokens and/or the syntactical structure of groups of tokens identified as potential trigger tokens may be defined, as appropriate for the application.

Starting at block 602, a potential trigger token identification sequence is initialized. For example, the system computing device 10 may initialize a potential trigger token identification sequence. For example, the system computing device 10 may comprise means, such as processor 12, memory 14, NLP model circuitry 202, attack circuitry 204, and/or the like, for initializing a potential trigger token identification sequence. In an example embodiment, a first search word may be selected from the embedding space of the first NLP model (e.g., from the vocabulary of the first NLP model) and concatenated to front and/or end of each text of a set of input texts. For example, a common word, such as "the," "a," "an," and/or the like may be selected as the first search word. The input texts from the set of input texts having the first search word concatenated to the beginning and/or end thereof may then be provided to the first NLP model to determine a value of the loss function and/or a gradient of the loss function.

At block 604, a rule-based search is used to explore the embedding space of the first NLP model. For example, the system computing device 10 may perform a rule-based search to explore the embedding space of the first NLP model. For example, the system computing device 10 may comprise means, such as processor 12, memory 14, NLP model circuitry 202, attack circuitry 204, and/or the like, for iteratively performing a rule-based search to explore the embedding space of the first NLP model. For example, the first search word may be replaced with a second search word and the resulting loss function may be determined. For example, the ith search word may be replaced based on $\mathrm{argmin}_{e_{i+1}^j \in V}[e_{i+1}^j - e_i^j]\nabla_{e^j} L$, where V is the vocabulary of the first NLP model and the search is subject to the additional condition(s) corresponding to set and/or predefined rules relating to the sequence of POS tags of the tokens. In an example embodiment, the loss function L is the logistic loss function such that $L = -y \log \hat{y} - (1-y)\log(1-\hat{y})$, where y is the original label of the input text (e.g., wherein the input text is labeled training data, for example) and $\hat{y}$ is the model prediction. Thus, the embedding space of the first NLP model may be iteratively stepped through based on $\mathrm{argmin}_{e_{i+1}^j \in V}[e_{i+1}^j - e_i^j]\nabla_{e^j} L$ to identify words within the vocabulary of the model that satisfy the additional condition(s) corresponding to the set or predefined rules relating to the sequence of POS tags.

At block 606, one or more potential trigger tokens are identified based on the search. For example, the system computing device 10 may identify one or more potential triggers based on the search of the embedding space of the first NLP model. For example, the system computing device 10 may comprise means, such as processor 12, memory 14, NLP model circuitry 202, attack circuitry 204, and/or the like, for identifying one or more potential triggers based on the search of the embedding space of the first NLP model. For example, when a word is identified based on the stepping through of embedding space that satisfies the additional condition(s) corresponding to set and/or predefined rules relating to the sequence of POS tags of the tokens being stepped through, that word is identified as a potential trigger token.

At block 608, once a potential trigger token is identified, a set of loss maximizing tokens for the identified potential trigger token is determined. For example, the set of loss maximizing tokens for the identified potential trigger token may be a token that is similar to the potential trigger token. For example, the Euclidean distance or cosine distance between two embedding vectors within the embedding space may indicate the similarity or lack thereof between two corresponding words. For example, if the cosine distance between two embedding vectors within the embedding space is less than a threshold level, the two corresponding words are deemed to be similar, in an example embodiment. For example, the set of loss maximizing tokens for a potential trigger token may be used to determine modifying tokens corresponding to a modification trigger generated and/or determined based on the potential trigger token. In an example embodiment, the set of loss maximizing tokens for a potential trigger token may be generated based at least in part on and/or filtered based at least in part on a context or semantic model, such as the Bidirectional Encoder Representations from Transformers (BERT) masked language model, for example.

In general, the potential trigger token and corresponding set of loss maximizing tokens are configured to test the robustness of the first NLP model. For example, if the first NLP model is a classifier, the potential trigger token may be a word within the vocabulary of the first NLP model that inclusion of the word within a text where the word was not previously present and/or replacing of the word within a text where the word was present with a similar word (e.g., a word from the set of loss maximizing tokens) is likely to cause the first NLP model to provide a different classification for the modified text compared to the original text.

In various embodiments, block 604, 606, and/or 608 may be performed in a cycle to iteratively step through the embedding space of the first NLP model and identify the one or more potential trigger tokens. In an example embodiment, the additional conditions may be evolved during the iterative searching to identify sequences of POS tags of the tokens being stepped through that maximize the value of the loss function or the gradient of the loss function at the location of a particular embedding vector. In various embodiments, the iterative searching of the embedding space may continue until a maximum number of iterations have been reached or there are no more words in the vocabulary of the first NLP model that satisfy the additional conditions.

The potential trigger tokens and corresponding sets of loss maximizing words may then be used to determine modification trigger tokens and corresponding modifying tokens. As noted above, a modification rule may be generated by determining a modification trigger and corresponding modifying tokens and defining metadata and/or other information required to modify an instance of test data based on the modification trigger token and modifying tokens. For example, the modification rule may be a replacement rule and the information required to modify an instance of test data may indicate that when the modification trigger token is present in a particular syntactic structure (e.g., an adjective-noun pair and/or the like) the modification trigger token may be replaced by a modifying token. For example, the modification rule may be an insertion rule and the information required to modify an instance of test data may indicate that when the modification trigger token is present and is associated with a particular POS tag, a modifying token may be inserted into the instance of test data at a particular position with respect to the modification trigger token (e.g., directly before and/or directly after the modification trigger token). The modification rules may then be used to generate instances of modified test data that may be used to test the robustness of the first NLP model.

C. Determining Modification Rules

Figure 7A:
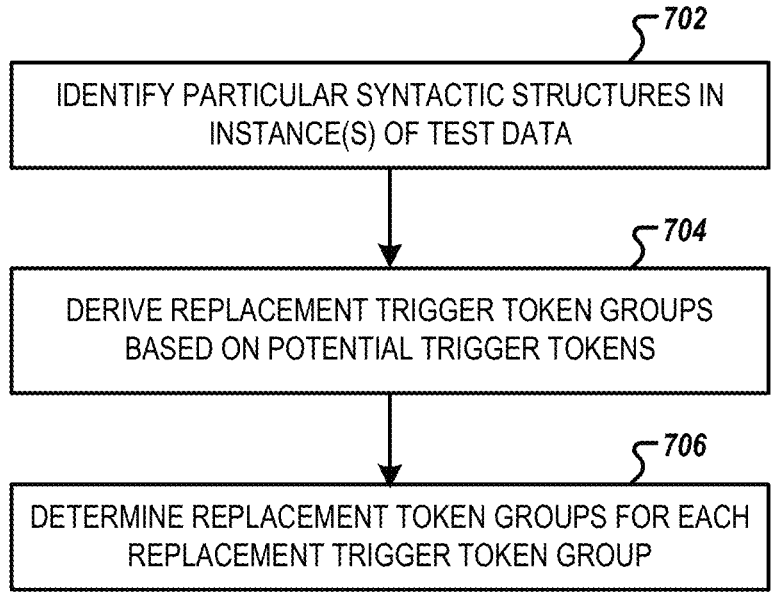
FIGS. 7A and 7B provide flowcharts illustrating operations performed, such as by the system computing entity of FIG. 2, to determine modification rules, in accordance with various embodiments described herein.
Figure 7B:
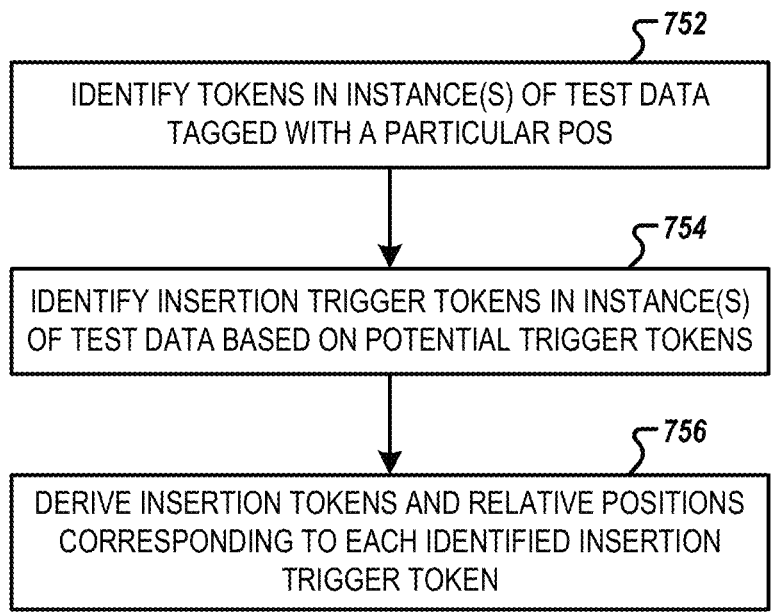

Once potential trigger tokens for the first NLP model have been identified and POS-tagged instances of test data have been obtained, modification rules (e.g., modification trigger tokens, modifying tokens, and any additional rule information (e.g., relative insertion position of an insertion token relative to an insertion trigger token)) have been determined, defined, and/or the like. FIG. 7A provides a flowchart illustrating example processes, procedures, operations and/or the like for determining modification rules such as replacement rules, according to an example embodiment. FIG. 7B provides a flowchart illustrating example processes, procedures, operations, and/or the like for determining modification rules such as insertion rules, according to an example embodiment. For example, the processes, procedures, operations, and/or the like of FIGS. 7A and/or 7B may be performed as part of block 406, in an example embodiment. In various embodiments, the modification rules used to generate instances of modified test data for an attack and/or test may include replacement rules and/or insertion rules.

For example, a replacement rule may be generated by starting at block 702 of FIG. 7A. For example, at block 702, particular syntactic structures may be identified in one or more instances of test data. For example, the system computing device 10 may identify particular syntactic structures within the instances of test data. For example, the system computing device 10 may comprise means, such as processor 12, memory 14, attack circuitry 204, and/or the like, for identifying particular syntactic structures within the instances of test data. For example, as described above, the potential trigger tokens may be identified based on defined syntactic structures and/or conditions regarding POS tags associated with words. For example, the particular syntactic structures may comprise an adjective-noun pair, an adverb-verb pair, an adverb-adjective pair, an adverb-adjective-noun triplet, and/or other defined syntactic structure. For example, if the particular syntactic comprises adjective-noun pairs, the adjective-noun pair "good thing" is identified in the instance of test data 500.

At block 704, the replacement trigger token groups are derived based on the syntactic structures identified in the instances of test data and the potential trigger tokens. For example, the system computing device 10 may derive replacement trigger token groups based on the syntactic structures identified in the instances of test data and the potential trigger tokens. For example, the system computing device 10 may comprise means, such as processor 12, memory 14, attack circuitry 204, and/or the like, for deriving replacement trigger token groups based on the syntactic structures identified in the instances of test data and the potential trigger tokens. Continuing with the example shown in FIG. 5, the particular syntactic structure (e.g., adjective-noun pair) "good thing" was identified in the instance of test data 500 and "good" was identified as a potential trigger token. Thus, the replacement trigger token groups may be determined to include the token group "good *noun*" where *noun* may be any word associated with a noun POS tag.

At block 706, the replacement token groups are determined based on the derived replacement trigger token groups and the sets of loss maximizing tokens. For example, the system computing device 10 may determine one or more replacement token groups for each of the replacement trigger token groups. For example, the system computing device 10 may comprise means, such as processor 12, memory 14, attack circuitry 204, and/or the like, for determining one or more replacement token groups for each of the replacement trigger token groups. In an example embodiment, the replacement token groups comprise tokens corresponding to the set of loss maximizing tokens identified and/or determined for the corresponding potential trigger token. In an example embodiment, the replacement token groups may have the same syntactic structure as the corresponding replacement trigger token groups. For example, continuing with the example shown in FIG. 5, the replacement token groups determined for the replacement trigger token group "good *noun*" may include "strong *noun*," "effective *noun*," "successful *noun*," and/or the like, where strong, effective, and successful are words that were identified as being similar to the word good and/or as being a loss maximizing token for the word good. In various embodiments, the replacement token groups should have the same polarity (e.g., negative, neutral, positive) as the corresponding replacement trigger token group.

In an example embodiment, the replacement token groups may be filtered to only include token groups having the same syntactic structure as the corresponding replacement trigger token group. For example, continuing the example from FIG. 5, the replacement token groups would all have the syntactic structure "*adjective* *noun*." In example embodiment, the replacement token groups are filtered to only include words that satisfy a similarity relationship with at least one token in the corresponding replacement trigger token group. For example, the cosine distance (or other distance) between an embedding vector for at least one word in the replacement trigger token group and an embedding vector for the replacement token groups may satisfy a distance threshold criteria. For example, in an example embodiment, the cosine distance between an embedding vector for at least one word in the replacement trigger token group and an embedding vector for the replacement token groups is no greater than a threshold distance (e.g., 0.5, 0.45, 0.4, 0.35, 0.3, and/or the like).

Thus, replacement rules may be defined corresponding to the replacement trigger token groups and the corresponding replacement token groups that may then be used to generate instances of modified test data that are likely to yield a different output from an NLP model compared to a corresponding instance of test data.

For example, an insertion rule may be generated by starting at block 752 of FIG. 7B. For example, at block 752, tokens tagged with a particular POS may be identified in one or more instances of test data. For example, the system computing device 10 may identify tokens tagged with a particular POS within the instances of test data. For example, the system computing device 10 may comprise means, such as processor 12, memory 14, attack circuitry 204, and/or the like, for identifying tokens tagged with a particular POS within the instances of test data. For example, as described above, the potential trigger tokens may be identified based on defined syntactic structures and/or conditions regarding POS tags associated with words (e.g., the potential trigger tokens may be associated with and/or tagged as a particular type of POS). For example, the particular POS may be adjective and all of the adjectives within the instances of test data may be identified. In an example embodiment, the particular POS may be a syntactic structure such as adjective-noun pair, adverb-adjective pair, and/or the like and such syntactic structures within the instances of test data may be identified. For example, if the particular POS is adjective, the adjective "good" is identified in the instance of test data 500.

At block 754, the insertion trigger tokens are derived based on the particular POSs identified in the instances of test data and the potential trigger tokens. For example, the system computing device 10 may derive insertion trigger tokens based on the particular POSs identified in the instances of test data and the potential trigger tokens. For example, the system computing device 10 may comprise means, such as processor 12, memory 14, attack circuitry 204, and/or the like, for deriving insertion trigger tokens based on that particular POSs identified in the instances of test data and the potential trigger tokens. Continuing with the example shown in FIG. 5, for the particular POS adjective, the adjective "good" was identified in the instance of test data 500 and "good" was identified as a potential trigger token. Thus, the insertion trigger tokens may be determined to include the token "good" and be associated with a particular position with relation to the token good where an insertion token should be inserted. For example, an insertion trigger token "good" may be defined with the relative position indicating that the insertion token should be inserted directly before the token "good."

At block 756, the insertion tokens are determined based on the derived insertion trigger tokens and the sets of loss maximizing tokens. For example, the system computing device 10 may determine one or more insertion tokens for each of the insertion trigger tokens. For example, the system computing device 10 may comprise means, such as processor 12, memory 14, attack circuitry 204, and/or the like, for determining one or more insertion tokens for each of the insertion trigger tokens. In an example embodiment, the insertion tokens comprise tokens corresponding to the set of loss maximizing tokens identified and/or determined for the corresponding potential trigger token. In an example embodiment, the insertion tokens may be associated with a particular POS tag. For example, for the example insertion trigger token "good" associated with the particular position directly-in-front-of, the corresponding insertion tokens may each be associated with an adverb POS tag such that application of the insertion rule does not break any syntax rules associated with the instance of test data (e.g., syntax rules of the language within which the instance of test data is written).

In example embodiment, the insertion tokens are filtered to only include words that satisfy a similarity relationship with the insertion trigger token. For example, the cosine distance (or other distance) between an embedding vector insertion trigger token and an embedding vector for the insertion token may satisfy a distance threshold criteria. For example, in an example embodiment, the cosine distance between an embedding vector for the insertion trigger token and an embedding vector for the insertion token is no greater than a threshold distance (e.g., 0.5, 0.45, 0.4, 0.35, 0.3, and/or the like).

Thus, insertion rules may be defined corresponding to the insertion trigger tokens and the corresponding insertion tokens that may then be used to generate instances of modified test data that are likely to yield a different output from an NLP model compared to a corresponding instance of test data.

D. Generating Instances of Modified Test Data

Figure 8A:
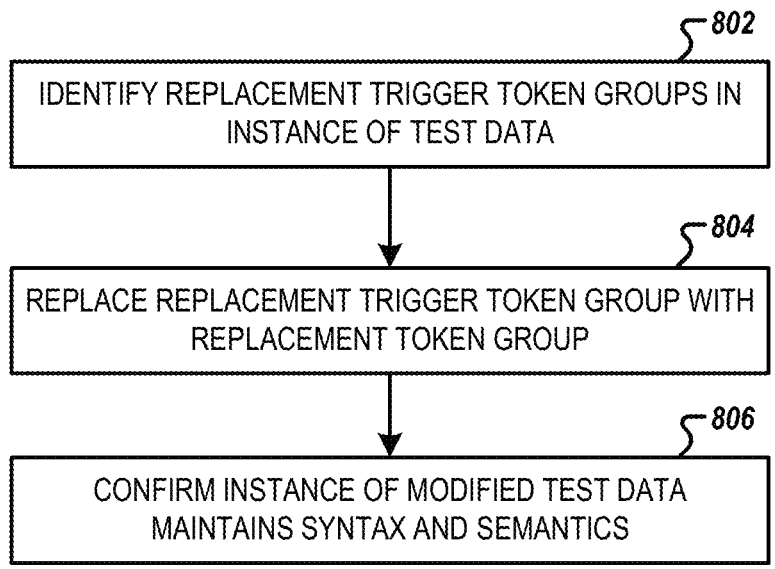
FIGS. 8A and 8B provide flowcharts illustrating operations performed, such as by the system computing entity of FIG. 2, to generate an instance of modified test data, in accordance with various embodiments described herein.
Figure 8B:
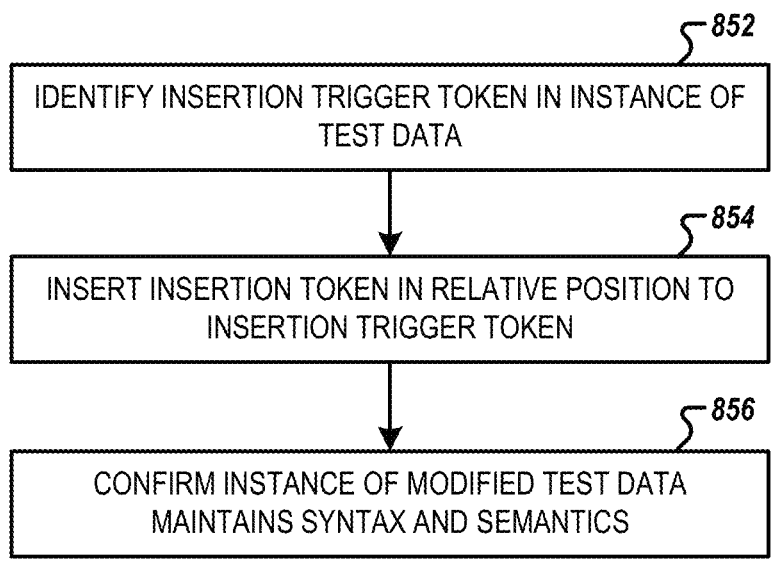

Once modification rules (e.g., modification trigger tokens, modifying tokens, and any additional rule information (e.g., relative insertion position of an insertion token relative to an insertion trigger token)) have been determined, defined, and/or the like, the modification rules may be used to generate instances of modified test data. FIG. 8A provides a flowchart illustrating example processes, procedures, operations and/or the like for generating an instance of modified test data using and/or based on a modification rule such as a replacement rule, according to an example embodiment. FIG. 8B provides a flowchart illustrating example processes, procedures, operations, and/or the like for generating an instance of modified test data using and/or based on a modification rule such as an insertion rule, according to an example embodiment. For example, the processes, procedures, operations, and/or the like of FIGS. 8A and/or 8B may be performed as part of block 408, in an example embodiment. In various embodiments, the modification rules used to generate instances of modified test data for an attack and/or test may include replacement rules and/or insertion rules.

FIG. 8A illustrates an example of generating an instance of modified test data using a replacement rule. Starting at block 802 of FIG. 8A, the replacement trigger token groups present within an instance of test data may be identified. For example, the system computing device 10 may identify replacement trigger token groups present within an instance of test data. For example, the system computing device 10 may comprise means, such as processor 12, memory 14, attack circuitry 204, and/or the like, for identifying replacement trigger token groups present within an instance of test data. For example, a modification rule (e.g., a replacement rule) may include the replacement trigger token group "good *noun*." Thus, for the instance of test data 500, the replacement trigger token group "good thing" may be identified as a replacement trigger token group present in the instance of test data. In an example embodiment, no more than one replacement trigger token group is identified within each instance of test data. In an example embodiment, multiple replacement trigger token groups may be identified within an instance of test data if tokens and/or groups of tokens satisfying replacement rules are present in the instance of test data.

At block 804, one or more of the identified replacement trigger token groups is replaced with a replacement token group to generate an instance of modified test data. For example, the system computing device 10 may replace one or more of the replacement trigger token groups identified as being present in the instance of test data with a replacement token group from the same replacement rule. For example, the system computing device 10 may comprise means, such as processor 12, memory 14, attack circuitry 204, and/or the like, for replacing one or more of the replacement trigger token groups identified as being present in the instance of test data with a replacement token group from the same replacement rule. In an example embodiment, multiple instances of modified test data may be generated from an instance of test data by using different replacement token groups to replace an identified replacement trigger token group. For example, the replacement trigger token group 504 identified as being present in the instance of test data 500 may be replaced with any of the replacement token groups 506 to form the instances of modified test data 502.

At block 806, it may be determined whether the instance of modified test data maintains the syntax and the semantic meaning of the corresponding instance of test data. For example, if it is determined that the instance of modified test data does not maintain the syntax and/or the semantic meaning of the corresponding instance of test data, the instance of modified test data may be filtered out of the set of instances of modified test data used to perform the white and/or black box attack of the respective first or second NLP model. For example, the system computing device 10 may determine whether the instance of modified test data maintains the syntax and the semantic meaning of the corresponding instance of test data. For example, the system computing device 10 may comprise means, such as processor 12, memory 14, attack circuitry 204, and/or the like, for determining whether the instance of modified test data maintains the syntax and the semantic meaning of the corresponding instance of test data.

In an example embodiment, a masked language model (e.g., the BERT masked language model) is used to determine whether an instance of modified test data maintains the syntax and semantic meaning of the corresponding instance of test data. For example, the instance of test data may be "I bought these to have additional sound outside" and the adjective-noun pair "additional sound" may be identified as a replacement trigger token group. The corresponding replacement token groups may be "many sound," "extra sound," "full sound," and "total sound." A prediction probability may be determined for each possible replacement trigger token group by providing the masked text "I bought these to have [MASK] sound outside" and the input options "many," "extra," "full," and "total" as input to the masked language model. For example, the masked language model may provide a prediction probability corresponding to each of the input options indicating that the input option "extra" have a relatively high probability of being the masked word, the input option "many" has a low probability of being the masked word, and/or the like. Input options that are assigned a prediction probability that satisfies a probability threshold criteria may be used to generate an instance of modified test data and/or a corresponding instance of modified test data may not be filtered out of the set of instances of modified test data used to perform the white and/or black box attack of the respective first or second NLP model. For example, in an example embodiment, the prediction probability of a replacement token group must be greater than a threshold probability (e.g., 0.01%, 0.05%, 0.1%, 0.5%, and/or the like as appropriate for the masked language model) to be used to generate an instance of modified test data and/or to have a corresponding instance of modified test data may not be filtered out of the set of instances of modified test data used to perform the white and/or black box attack of the respective first or second NLP model.

In various embodiments, block 806 may be performed before block 804. For example, the replacement token groups may be filtered for a particular identified replacement trigger token group in an instance of test data and then instances of modified test data corresponding to the instance of test data may be generated using the filtered replacement token groups.

FIG. 8B provides an example of generating an instance of modified test data using an insertion rule. Starting at block 852 of FIG. 8B, the insertion trigger tokens present within an instance of test data may be identified. For example, the system computing device 10 may identify insertion trigger tokens present within an instance of test data. For example, the system computing device 10 may comprise means, such as processor 12, memory 14, attack circuitry 204, and/or the like, for identifying insertion trigger tokens present within an instance of test data. For example, a modification rule (e.g., an insertion rule) may include the insertion trigger token "good." Thus, for the instance of test data 500, the insertion trigger token "good" may be identified as an insertion trigger token present in the instance of test data. In an example embodiment, no more than one insertion trigger token is identified within each instance of test data. In an example embodiment, multiple insertion trigger tokens may be identified within an instance of test data if tokens satisfying insertion rules are present in the instance of test data.

At block 854, one or more insertion tokens of the identified insertion trigger tokens are inserted at a particular position relative to the respective insertion trigger token within the instance of test data to generate an instance of modified test data. For example, the system computing device 10 may insert an insertion token of the same insertion rule as an identified insertion trigger token at a particular position relative to the respective insertion trigger token, as indicated by the insertion rule, within the instance of test data to generate an instance of modified test data. For example, the system computing device 10 may comprise means, such as processor 12, memory 14, attack circuitry 204, and/or the like, for inserting an insertion token of the same insertion rule as an identified insertion trigger token at a particular position relative to the respective insertion trigger token, as indicated by the insertion rule, within the instance of test data to generate an instance of modified test data. In an example embodiment, multiple instances of modified test data may be generated from an instance of test data by inserting different insertion tokens at the particular position relative the identified insertion trigger token. For example, continuing with the example instance of test data 500 and the insertion trigger token "good", the insertion tokens "super" and "fantastically" may be inserted at the particular position relative to the insertion trigger token (e.g., immediately in front of the insertion trigger token) identified as being present in the instance of test data 500 to form the instances of modified test data "The only super good thing about these is that they're easy to set up" and "The only fantastically good thing about these is that they're easy to set up."

At block 856, it may be determined whether the instance of modified test data maintains the syntax and the semantic meaning of the corresponding instance of test data. For example, if it is determined that the instance of modified test data does not maintain the syntax and/or the semantic meaning of the corresponding instance of test data, the instance of modified test data may be filtered out of the set of instances of modified test data used to perform the white and/or black box attack of the respective first or second NLP model. For example, the system computing device 10 may determine whether the instance of modified test data maintains the syntax and the semantic meaning of the corresponding instance of test data. For example, the system computing device 10 may comprise means, such as processor 12, memory 14, attack circuitry 204, and/or the like, for determining whether the instance of modified test data maintains the syntax and the semantic meaning of the corresponding instance of test data.

In an example embodiment, a masked language model (e.g., the BERT masked language model) is used to determine whether an instance of modified test data maintains the syntax and semantic meaning of the corresponding instance of test data. For example, a masked version of the instance of test data, with the mask inserted at the particular position relative to the insertion trigger token indicated by the insertion rule, may be provided to the masked language model as the masked text and the insertion tokens may be provided to the masked language model as the input options. For example, continuing with the above example, the sentence "The only [MASK] good thing about these is that they're easy to set up." may be provided as the masked text and the insertion tokens "super" and "fantastically" may be provided as the input options. In an example embodiment, the masked language model may provide a prediction probability corresponding to each of the input options indicating a probability of the corresponding input option being the masked word. Input options (e.g., insertion tokens) that are assigned a prediction probability that satisfies a probability threshold criteria may be used to generate an instance of modified test data and/or a corresponding instance of modified test data may not be filtered out of the set of instances of modified test data used to perform the white and/or black box attack of the respective first or second NLP model. For example, in an example embodiment, the prediction probability assigned to an insertion token by the masked language model must be greater than a threshold probability (e.g., 0.01%, 0.05%, 0.1%, 0.5%, and/or the like as appropriate for the masked language model) to be used to generate an instance of modified test data and/or to have a corresponding instance of modified test data may not be filtered out of the set of instances of modified test data used to perform the white and/or black box attack of the respective first or second NLP model.

In various embodiments, block 856 may be performed before block 854. For example, the insertion tokens may be filtered for a particular identified insertion trigger token in an instance of test data and then instances of modified test data corresponding to the instance of test data may be generated using the filtered insertion tokens.

As should be understood, a plurality of instances of modified test data may be generated based on one or more instances of test data and/or one or more modification rules (e.g., replacement rules, insertion rules, and/or combinations thereof). Once the instances of modified test data are generated, they, and the corresponding instances of test data, may be provided to the first NLP model as part of a white box attack or test or provided to the second NLP model as part of a black box attach or test.

E. Determining and Providing Robustness Information for a Second NLP Model

In various embodiments, robustness information may be determined and provided for a second NLP model. As used herein a second NLP model is an NLP model for which information regarding the model (e.g., the loss function, the gradient of the loss function, and/or the like) is not known and/or not used in preparing the instances of modified test data for use in determining the robustness of the second NLP model. For example, a black box attack or test of the second NLP model may be used to determine robustness information corresponding to the second NLP model.

In various embodiments, modification rules generated, determined, and/or learned through performing white box attacks or tests of the robustness of one or more first NLP models and determining the attack results thereof, may be used to perform one or more black box attacks or tests of the robustness of one or more second NLP models. For example, the attack results determined based on white box attacks or tests of the robustness of one or more first NLP models may indicate that one or more modification rules caused the output of a first NLP model to change. For example, when an instance of test data and an instance of modified test data generated based on the instance of test data and the modification rule are provided to a first NLP model, the output corresponding to the instance of test data and the output corresponding to the instance of modified test data are different and/or not similar, the modification rule may be identified (e.g., in the attack results) as being a potentially effective modification rule for use in a black box attack or test of a second NLP model.

Figure 9:
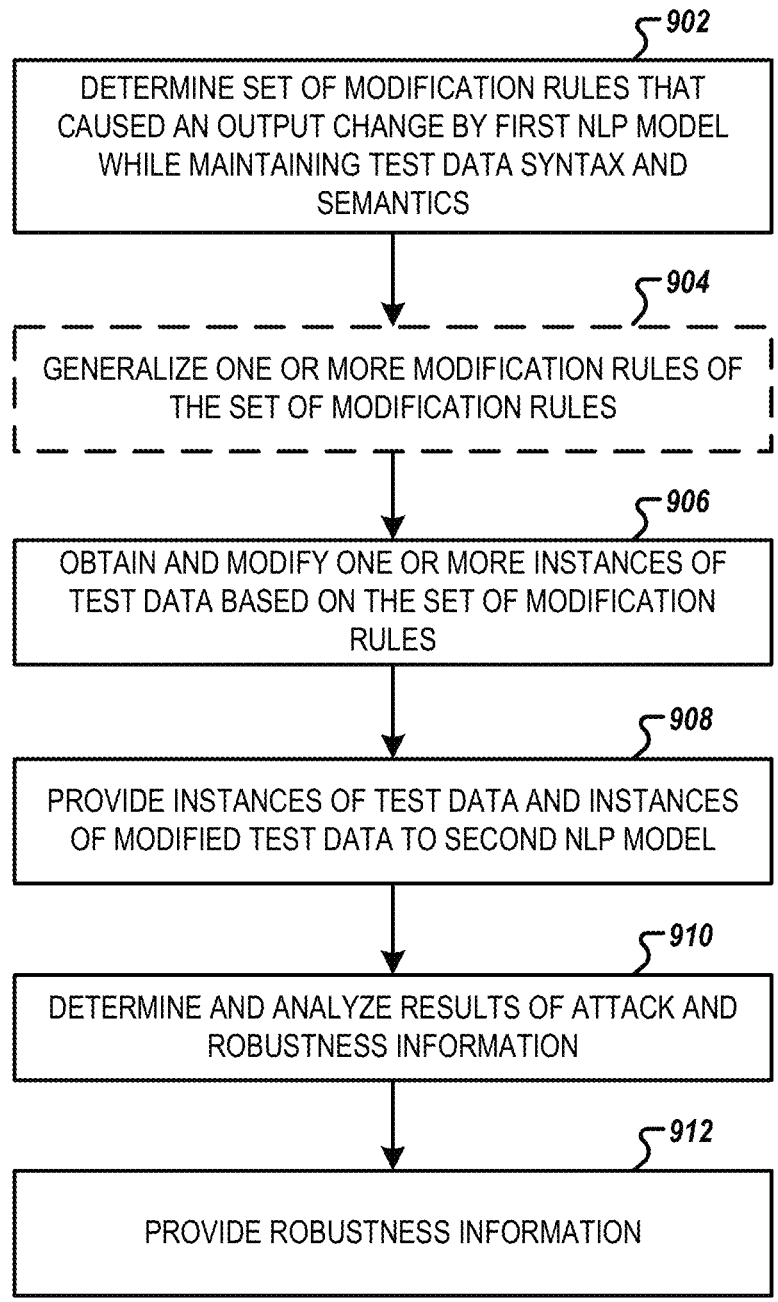
FIG. 9 is a flowchart illustrating operations performed, such as by the system computing entity of FIG. 2, to perform a black box attack of a second NLP model, in accordance with an example embodiment described herein.

FIG. 9 provides a flowchart illustrating processes, procedures, operations, and/or the like performed, for example, by a system computing device 10, for performing a black box attack or test of the robustness of a second NLP model. Starting at block 902, a set of modification rules that caused an output change when used to generate instances of modified test data for a white box attack or test of one or more first NLP models while maintaining the syntax and semantic meaning of the corresponding instance of test data may be identified and/or determined. For example, the system computing device 10 may identify and/or determine a set of modification rules that caused an output change when used to generate instances of modified test data for a white box attack or test of one or more first NLP models while maintaining the syntax and semantic meaning of the corresponding instance of test data. For example, the system computing device 10 may comprise means, such as processor 12, memory 14, NLP model circuitry 202, attack circuitry 204, and/or the like, for determining and/or identifying a set of modification rules that caused an output change when used to generate instances of modified test data for a white box attack or test of one or more first NLP models while maintaining the syntax and semantic meaning of the corresponding instance of test data.

For example, modification rules (e.g., replacement rules, insertion rules, and/or the like) may be determined as described with respect to FIGS. 4, 6, 7A, and/or 7B and used to perform a white box attack or test of one or more first NLP models, as described with respect to FIG. 4. The attack results for the white box attack or test (e.g., as determined at block 416) may include an indication of which modification rules generated instances of modified test data that caused output changes. For example, one or more modification rules (e.g., replacement rules, insertion rules, and/or the like) are identified for which when an instance of test data was provided to the first NLP, the first NLP provided a first output and when an instance of modified test data generated based on the instance of test data and the modification rules was provided to the first NLP, the first NLP provided a second output that was different and/or not similar to the first output. Thus, modification rules that were determined to cause an output change when used to generate instances of modified test data for white box attacks or tests may be determined and/or identified and a set of such modification rules may be compiled, aggregated, and/or the like. In various embodiments, an output changing modification rule comprises a corresponding modification trigger, one or more corresponding modifying tokens, and any information needed to modify an instance of test data based on the modification trigger and one of the one or more modifying tokens. The output changing modification rule may further comprise metadata corresponding to one or more modification rules that were used to define the output changing modification rule (e.g., metadata indicating how often an instance of modified test data generated based on the rule yields a second output that is different from and/or not similar to the first output obtained based on the corresponding instance of test data and/or the like).

Continuing with FIG. 9, at block 904, one or more modification rules of the set of modification rules may be generalized. For example, the system computing device 10 may generalize one or more modification rules of the set of modification rules to generate generalize modification rules. For example, the system computing device 10 may comprise means, such as processor 12, memory 14, attack circuitry 204, and/or the like, for generalizing one or more modification rules of the set of modification rules to generate generalize modification rules. For example, the set of modification rules may include a replacement rule with the replacement trigger token group "good *noun*" and another replacement rule with the replacement trigger token group "nice *noun*." The vector embeddings for "good" and "nice" may be similar. For example, the cosine distance between the vector embeddings for "good" and "nice" may satisfy the similarity relationship (e.g., may be no greater than the threshold distance). Thus, the two replacement rules may be generalized into a generalized modification rule having a replacement trigger token group "*adjective similar to good or nice* *noun*," where *adjective similar to good or nice* indicates an adjective that satisfies the similarity relationship with "good" and/or "nice" and that has replacement token groups that are a union or intersection of the replacement token groups of the two combined modification rules. Various other generalized modification rules may be determined based on the set of modification rules. For example, a generalized modification rule may comprise a replacement trigger token group or insertion trigger token that is a syntactic structure (e.g., "*adjective* *noun*," "*adverb* *verb*," "*adverb* *adjective* *noun*" "*preposition* *article* *noun*," and/or the like) and the replacement token group or insertion token may be determined based on words identified within an instance of test data as being of the syntactic structure (e.g., based on polarity, distance between embedding vectors, the masked language model probability predictions, and/or the like) such that instances of modified test data generated using the generalized modification rule maintain the syntax and semantic meaning of the instance of test data.

At block 906, one or more POS-tagged instances of test data are obtained and one or more instances of modified test data are generated. For example, the system computing device 10 may receive, access, and/or otherwise obtain one or more POS-tagged instances of test data. For example, the system computing device 10 may comprise means, such as processor 12, memory 14, communications circuitry 16, attack circuitry 204, and/or the like, for obtaining one or more POS-tagged instances of test data. A POS-tagged instance of test data is a set of text (e.g., words, terms, sentences, comments, messages, and/or the like) where each word or term of the text is tagged with the corresponding part of speech (e.g., noun, verb, adjective, adverb, pronoun, conjunction, preposition, interjection). For example, each word or term of an instance of test data may be associated with a tag that indicates the part of speech of the word or term. In an example embodiment, the instance of test data is received, accessed, and/or the like; the instance of test data is analyzed to determine the part of speech of each word or term of the instance of test data; and each word or term of the instance of test data is tagged with the determined part of speech. In an example embodiment, the instance of test data comprises and/or is associated with POS tags when the instance of test data is received, accessed, and/or otherwise obtained. In various embodiments, an instance of test data conveys a semantic meaning and is structured in accordance with a syntax. For example, the instance of test data may be structured in accordance with the syntax of the language corresponding to the words or terms of the instance of test data.

Modification triggers within the POS-tagged instances of test data may be identified. For example, the system computing device 10 may identify and/or determine modification rules that relevant to the instances of test data. For example, modification rules for which the modification trigger is present in an instance of test data may be determined and/or identified. For example, the system computing device 10 may comprise means, such as such as processor 12, memory 14, attack circuitry 204, and/or the like, for identifying and/or determining modification rules relevant to the instances of test data. For example, it may be determined which of the modification triggers (e.g., replacement trigger token groups, insertion trigger tokens, and/or the like) are present in the one or more instances of test data. For each modification trigger, one or more modifying tokens may be determined and/or identified. For example, a modification trigger may be a replacement trigger token group and the modifying tokens may be words, terms, phrases, and/or the like that the replacement trigger token group is replaced with to form an instance of modified test data. For example, a modification trigger may be an insertion trigger token and the modifying tokens may be words, terms, phrases, and/or the like that are inserted into the instance of test data at a set position relative to the insertion trigger token to form an instance of modified test data.

In various embodiments, the modification trigger token may be one or more tokens, a combination of tokens and syntactical structures (e.g., adjective-noun pairs and/or other groupings), and/or syntactical structures. In various embodiments, the modifying tokens may include a single token that is inserted into and/or used to replace a token in the instance of test data or may include multiple tokens (e.g., a phrase) that is inserted into and/or used to replace a token or group of tokens (e.g., a word or phrase) in the instance of test data to form an instance of modified test data. In various embodiments, the modification trigger and modifying tokens (and the set relative position in the case of an insertion token/ insertion trigger token) are configured to maintain the syntax of an instance of test data. For example, the modification rules relevant to each instance of test data may be determined in a manner similar to that described with respect to FIGS. 7A and/or 7B.

Based on the set of modification rules and the instances of test data, one or more instances of modified test data are generated. For example, the system computing device 10 may generate one or more instances of modified test data. For example, the system computing device 10 may comprise means, such as processor 12, memory 14, attack circuitry 204, and/or the like, for generating one or more instances of modified test data. For example, based on the determined modification triggers and modifying tokens of the set of modification rules, one or more instances of test data may be analyzed and used as a basis for generating one or more corresponding instances of modified test data. For example, an instance of modified test data may be generated by identifying one or more modification triggers within an instance of test data and generating a new instance of modified test data within which one or more tokens has been modified based on the identified modification trigger(s) and modifying tokens. For example, a new instance of modified test data may be generated by replacing one or more tokens within an instance of test data based on one or more replacement trigger token groups and corresponding replacement token groups. For example, new instance of modified test data 502A may be generated by replacing the token "good" or the token group "good *noun*" from the replacement trigger token group "good thing" corresponding to the syntactical structure "good *noun*" with a replacement token "strong" or replacement token group "strong thing." In another example, a new instance of modified test data is generated by inserting an insertion token into the set relative position corresponding to an insertion trigger token. For example, the instance of test data "The only thing about these is that they're easy to set up" may be modified to form the instance of modified test data "The only fantastic thing about these is that they're easy to set up." As used herein, an instance of test data and an instance of modified test data correspond to one another when the instance of modified test data was generated from and/or based at least in part on the instance of test data.

For example, one or more instances of modified test data may be generated in a manner similar to that described with respect to FIGS. 8A and/or 8B. For example, in an example embodiment, the generated instances of modified test data may be filtered to exclude instances of modified test data that do not maintain the semantic meaning and/or syntax of the corresponding instance of test data. For example, similar to as described with respect to block 806 and/or 856, a masked language model may be used to determine a prediction probability for each modifying token and only modifying tokens having a prediction probability that satisfies a probability threshold criteria may be used to generate an instance of modified test data and/or a corresponding instance of modified test data may not be filtered out of the set of instances of modified test data used to perform the black box attack of the second NLP model. For example, in an example embodiment, the prediction probability of a modifying must be greater than a threshold probability (e.g., 0.01%, 0.05%, 0.1%, 0.5%, and/or the like as appropriate for the masked language model) to be used to generate an instance of modified test data and/or a corresponding instance of modified test data may not be filtered out of the set of instances of modified test data used to perform the black box attack of the second NLP model.

At block 908, one or more instances of test data and one or more corresponding instances of modified test data are provided as input to the second NLP model. For example, the system computing device 10 may provide one or more instances of test data and one or more corresponding instances of modified test data to an input layer of the second NLP model. For example, the system computing device 10 may comprise means, such as processor 12, memory 14, NLP model circuitry 202, attack circuitry 204, and/or the like, for providing one or more instances of test data and one or more corresponding instances of modified test data to an input layer of the second NLP model. For example, instances of test data and corresponding instances of modified test data may be provided to the second NLP model for analysis, classification, and/or the like by the first NLP model.

At block 910, results are obtained from the second NLP model and the output may be analyzed to determine attack results of the black box attack or test and/or robustness information for the second NLP model. For example, the results of the second NLP model analyzing, classifying, and/or the like the one or more instances of test data and one or more corresponding instances of modified test data may be obtained from the output layer of the second NLP model. For example, the system computing device 10 may obtain the results of the second NLP model analyzing, classifying, and/or the like the one or more instances of test data and one or more corresponding instances of modified test data. For example, the system computing device 10 may comprise means, such as processor 12, memory 14, NLP model circuitry 202, attack circuitry 204, and/or the like, for obtaining the results of the second NLP model analyzing, classifying, and/or the like the one or more instances of test data and one or more corresponding instances of modified test data.

The results obtained from the second NLP model analyzing, classifying, and/or the like the one or more instances of test data and one or more corresponding instances of modified test data may be analyzed to determine attack results and/or robustness information for the second NLP model. For example, instances of modified test data that yield results that are different from the results obtained based on the corresponding instance of test data are identified. For example, analyzing, classifying, and/or the like a first instance of test data by the second NLP model may yield a first output. For example, analyzing, classifying, and/or the like instances of modified test data corresponding to the first instances of test data by a second NLP model may yield respective second outputs. The first output and second outputs may be obtained from the second NLP model (e.g., the output layer of the second NLP model). The instances of modified test data that yield second outputs that are different from and/or not similar to the first output are identified. For example, if the second NLP model is a classifier (e.g., configured to determine a classification for an input text), a first output may be different from or not similar to a second output if the first output and the second output are different classifications. For example, if the second NLP model provides a summary or paraphrasing of an input text, it may be determined whether the summary provided by the first output and the summary provided by the second output are different or not similar. For example, it may be determined whether the first output and the second output satisfy a similarity criteria. For example, in a scenario where the second NLP model is a classifier, the similarity criteria may correspond to whether the first output and the second output correspond to the same classification, or, in the instance of hierarchical classifications, whether the first output and the second output correspond to sub-classes of the same class, and/or the like. For example, in a scenario where the second NLP model returns output text generated based at least in part on an input text (e.g., instance of test data and/or instance of modified test data), a vector within the embedding space determined based on the embedding vectors corresponding to one or more words of the output text may be determined for each of the first output and the second output. The vector corresponding to the first output and the vector corresponding to the second output may be compared and/or evaluated to determine whether the two vectors are sufficiently similar to satisfy the similarity criteria (e.g., the (Euclidean, cosine, and/or other) distance between the two vectors is no greater than a threshold value). For example, the first output obtained based on an instance of test data may be compared to a second output yielded based on a corresponding instance of modified test data to determine whether the result of analyzing the instance of test data by the second NLP model is different from the result of analyzing the corresponding instance of modified test data by the second NLP model. For example, the system computing device 10 may identify instances of modified test data that yield an output from the second NLP model that is different from the output yielded from the second NLP model when the corresponding instance of test data is provided as input to the second NLP model. For example, the system computing device 10 may comprise means, such as processor 12, memory 14, NLP model circuitry 202, attack circuitry 204, and/or the like, for identifying instances of modified test data that yield an output from the second NLP model that is different from the output yielded from the second NLP model when the corresponding instance of test data is provided as input to the second NLP model.

In various embodiments, the instances of modified test data that yield a second output that is different from and/or not similar to the first output obtained based on the corresponding instance of test data are tagged as output changing instances of modified test data. In various embodiments, the modification trigger and corresponding modifying token(s) used to generate an instance of modified test data that yielded a second output that is different from and/or not similar to the first output obtained based on the corresponding instance of test data are tagged and/or identified as an output changing rule. In various embodiments, a rule (e.g., an output changing rule) comprises a modification trigger, a modifying token(s), any information needed to modify an instance of test data using the modification trigger and the modifying token(s) (e.g., a relative position for insertion of an insertion token), and/or the like. In various embodiments, a rule may also be associated with metadata indicating how often an instance of modified test data generated based on the rule yields a second output that is different from and/or not similar to the first output obtained based on the corresponding instance of test data and/or the like.

In an example embodiment, based on comparisons of the first output obtained based on instances of test data and second outputs yielded based on corresponding instances of modified test data, the attack results may be determined and robustness information for the second NLP model may be determined. For example, the system computing device 10 may determine attack results and/or robustness information for the second NLP model based on comparisons of first outputs and respectively corresponding second outputs. For example, the system computing device 10 may comprise means, such as processor 12, memory 14, NLP model circuitry 202, attack circuitry 204, and/or the like, for determining attack results and/or robustness information for the second NLP model based on comparisons of first outputs and respectively corresponding second outputs.

For example, the number output changing instances of modified test data and/or percentage of instances of modified test data that were identified as being output changing instances of modified test data may be used to determine a robustness score for the second NLP model or other description or summary of the robustness of the second NLP model may be determined. For example, the attack results and/or robustness information may comprise a list of the output changing instances of modified test data and/or output changing modification rules identified based on the attack or test, a description and/or summary of the robustness of the second NLP model, such as a robustness score, and/or the like. For example, a robustness score may provide an indication of how robust the second NLP model is. In an example embodiment, the robustness score may provide an indication of how robust the second NLP model is in comparison to other first or second NLP models. For example, the robustness score may be numerical value, a letter grade (e.g., A, B, C, D, F, and/or the like) a brief summary of the attack results, a percentage of similar NLP models that the second NLP model performed better or worse than, a standard deviation of a measure of robustness determined for the second NLP model (e.g., based on the attack results) from an average measure of robustness for similar NLP models, and/or the like. For example, the robustness score for the first NLP model may be determined at least in part on the attack results. In an example embodiment, the attack results and/or robustness information may comprise information that may be used to improve the robustness of the second NLP model (e.g., via further training, re-training, and/or the like). For example, the attack results and/or robustness information may provide information regarding types of text that may be added to the training data used to train the second NLP model such that further training or re-training the second NLP model using the expanded training data would yield a more robust NLP model.

At block 912, the attack results and/or robustness information for the second NLP model is provided. For example, the attack results and/or robustness information may be stored in memory (e.g., memory 14), provided via an IUI (e.g., via communications circuitry 16 and input/output circuitry 28 or via input/output circuitry 18), and/or the like. For example, the attack results and/or robustness information may be provided via an IUI similar to the results IUI 1000 shown in FIG. 10. For example, system computing device 10 may provide (e.g., for storing, transmitting, display, and/or the like) and/or cause the providing (e.g., storing, display, and/or the like) at least a portion of the attack results and/or robustness information. For example, the system computing device 10 may comprise means, such as processor 12, memory 14, communication circuitry 16, input/output circuitry 18, and/or the like) for providing or causing the providing of at least a portion of the attack results and/or robustness information. In an example embodiment, the attack results and/or robustness information may be provided in an API call and/or as an API call response to a validation process and/or application. For example, if the attack was initiated by an API call from a validation process and/or application, the attack results and/or robustness information for the second NLP model may be provided via an API call response to the validation process and/or application.

F. Example Results Interactive User Interface (IUI)

Figure 10:
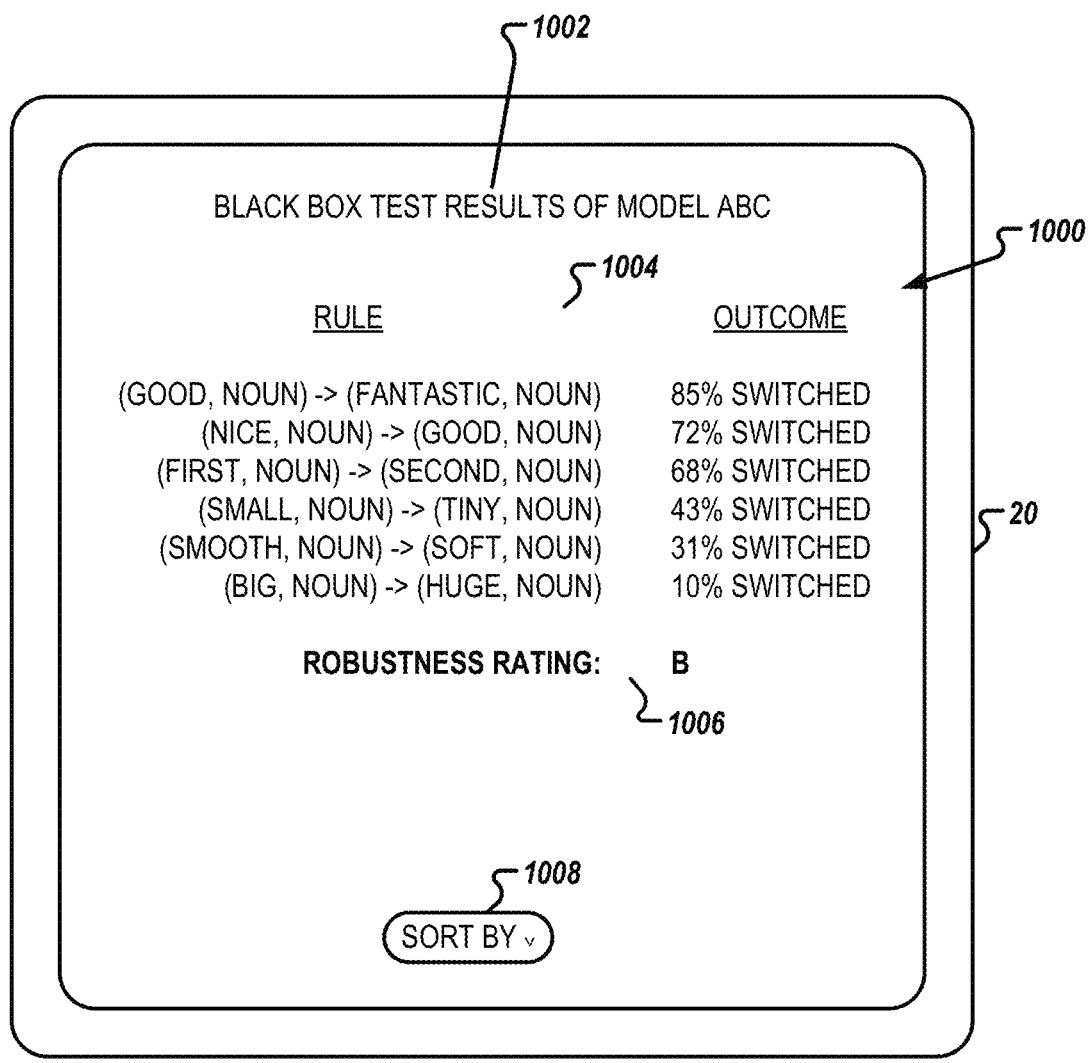
FIG. 10 illustrates an example interactive user interface (IUI) that may be used to provide robustness information determined for a first and/or second NLP model, in an example embodiment described herein.

FIG. 10 provides an example view of a results IUI 1000 that may be provided (e.g., via input/output circuitry 18, 28) to provide and/or display attack results and/or robustness information for one or more first and/or second NLP models. For example, attack results and/or robustness information for a first or second NLP model may be determined at block 416 or block 910, respectively. The attack results and/or robustness information for the first or second NLP model may then be provided at block 418 or block 912, respectively. For example, the attack results and/or robustness information for a first and/or second NLP models may be provided for storage (e.g., in memory 14, 24), provided (e.g., transmitted), possibly via an API call or API call response, such that a user computing device 20 receives the attack results and/or robustness information, and/or the like. For example, at least a portion and/or summary of the attack results and/or robustness information may be provided via results IUI 1000 provided via the input/output circuitry 18, 28. For example, when a user computing entity 20 receives the attack results and/or robustness information for the first or second NLP model and processes the received attack results and/or robustness information, the user computing entity may be caused to display the results IUI 1000 providing at least a portion of the attack results and/or robustness information. For example, the system computing device 10 may provide the attack results and/or robustness information such that the system computing device 10 causes the user computing device 20 to provide (e.g., display) at least a portion of the attack results and/or robustness information.

In the illustrated example embodiment, the results IUI 1000 may comprise attack results and/or robustness information metadata 1002. For example, the attack results and/or robustness information metadata 1002 may comprise an model identifier configured to identify the first or second NLP model which was tested and to which the attack result and/or robustness information pertains. For example, the attack results and/or robustness information metadata 1002 may further comprise an indication of the type of attack or test performed (e.g., white box or black box attack or test), when the test was performed (e.g., a date and/or time), and/or other parameters that may be required to reproduce the corresponding attack or test. The results IUI 1000 may further comprise information 1004 identifying one or more output changing rules, how effective the output changing rules were at causing output changes (e.g., causing first and second outputs to be different and/or not similar), information regarding which modification rules were used, and/or other information that summarizes the attack results. The results IUI 1000 may further comprise a robustness score 1006 and/or other information that provides an indication of how robust the first or second NLP model as indicated by the results of the white or black box attack or test. The results IUI 1000 may further comprise one or more interface features 1008 that may be interacted with (e.g., via input/output circuitry 28) to control how much of the attack results and/or robustness information is displayed, how and/or where the attack results and/or robustness information is displayed, cause the first or second NLP model to be further trained or re-trained based on the attack results, and/or the like.

TECHNICAL ADVANTAGES

Machine learning-trained models are used for a variety of tasks. An example machine learning-trained model is a NLP model. For example, a NLP model may be used to analyze, evaluate, and/or classify text, messages, and/or the like. For example, for a machine learning-trained model that is a NLP classifying model, the model is considered robust if a particular text and a version of the particular text with a small perturbation introduced therein result in the same classification. For example, the texts "The only good thing about these is that they're easy to set up." and "The only nice thing about these is that they're easy to set up." should be assigned the same classification, as they have the same semantic meaning. However, often introduction of small perturbations into a particular text causes the perturbed text and the particular text to be assigned different classifications by the NLP classifying model.

Various embodiments provide insight into how robust a model is. Moreover, various embodiments provide further understanding of the weaknesses of the NLP model which may provide an opportunity for improving the robustness of the NLP model (e.g., via further training of the NLP model, re-training of the NLP model, and/or the like). For example, various embodiments provide robustness information such as a robustness score for the corresponding NLP model, indication of how the robustness of the corresponding NLP model may be improved (e.g., via further training and/or re-training), and/or the like. Thus, various embodiments provide improvements in the field of machine learning and the use of machine learning-trained models. Various embodiments of the present disclosure provide the additional advantage of computationally efficiently and effectively determining the robustness of both white box and black box NLP models. Such determinations enable selection of more robust NLP models and/or improvement in NLP models to generate more robust NLP models. Therefore, various embodiments provide a technical solution to the technical problem of determining how sensitive to small perturbations in an input of a machine learning-trained model is and determining how to improve the robustness of a machine learning-trained model (e.g., reduce the sensitivity to small perturbations in the input of the machine learning-trained model).

CONCLUSION

FIGS. 4, 6, 7A, 7B, 8A, 8B, and 9 illustrate flowcharts describing sets of operations performed by apparatuses, methods, and computer program products according to various example embodiments. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for determining the robustness of a natural language processing (NLP) model, the method comprising:
    identifying, by processing circuitry, at least one potential trigger token by searching an embedding space of a first NLP model based on a loss function for the first NLP model;
    obtaining, by the processing circuitry, at least one instance of test data, the at least one instance of test data (a) comprising one or more words, (b) having a syntax, and (c) having a semantic meaning;
    based on the at least one potential trigger token and the at least one instance of test data, determining, by the processing circuitry, at least one modification trigger;
    determining, by the processing circuitry, one or more modifying tokens corresponding to the at least one modification trigger;
    generating, by the processing circuitry, one or more instances of modified test data wherein each modified instance of test data is generated by:
        identifying a location of the at least one modification trigger within the at least one instance of test data, and
        generating a new instance of modified test data which is the instance of test data modified at the location of the at least one modification trigger by one of the one or more modifying tokens corresponding to the at least one modification trigger;
    providing, by the processing circuitry, the at least one instance of test data and the one or more instances of modified test data as input to the first NLP model;
    for each of the at least one instance of test data and the one or more instances of modified test data provided as input to the first NLP model, obtaining, by the processing circuitry, a corresponding output from the first NLP model;
    determining, by the processing circuitry and using a machine learning model, which of the one or more instances of modified test data provided as input to the first NLP model correspond to an output that does not satisfy a similarity criteria with respect to the output corresponding to the corresponding instance of test data;
    determining, by the processing circuitry, robustness information for the first NLP model based on which of the one or more instances of modified test data correspond to an output that does not satisfy a similarity criteria with respect to the output corresponding to the corresponding instance of test data; and
    causing, by the processing circuitry, the robustness information for the first NLP model to be provided,
    wherein the method further comprises:
    determining one or more output changing modification rules based on which of the one or more instances of modified test data correspond to an output that does not satisfy a similarity criteria with respect to the output corresponding to the corresponding instance of test data;
    generating a set of instances of modified test data based on a set of instances of test data and the one or more output changing modification rules;
    providing at least a portion of the set of instances of modified test data and the set of instances of test data to a second NLP model;
    for each instance of the at least a portion of the set of instances of modified test data and the set of instances of test data provided to the second NLP model, obtaining a corresponding second NLP model output from the second NLP model;
    based on the second NLP model output for each of the instances of the at least a portion of the set of instances of modified test data and the set of instances of test data provided to the second NLP model, determining robustness information for the second NLP model; and
    causing the robustness information for the second NLP model to be provided.

2. The method of claim 1, wherein the at least one potential trigger token is identified based on a gradient of the loss function of the first NLP model evaluated at a position within embedding space corresponding to the at least one potential trigger token.

3. The method of claim 1, wherein each word of the one or more words is associated with a tag indicating a corresponding part of speech.

4. The method of claim 1, wherein at least one of (a) the one or more modifying tokens or (b) the one or more instances of modified test data are filtered such that the one or more instances of modified test data only include instances of modified test data that maintain the semantic meaning of the corresponding instance of test data.

5. The method of claim 4, wherein the filtering is performed based on a prediction probability determined for by a masked language model for each of the at least one of (a) the one or more modifying tokens or (b) the one or more instances of modified test data.

6. The method of claim 1, wherein an output changing modification rule of the one or more output changing modification rules comprises a corresponding modification trigger, one or more corresponding modifying tokens, and one or more information for modifying a given instance of test data based on the modification trigger and one of the one or more modifying tokens.

7. The method of claim 6, wherein the one or more information for modifying the given instance of test data based on the modification trigger and one of the one or more modifying tokens comprises a set position relative to the modification trigger at which the one of the one or more modifying tokens is to be inserted to generate an instance of modified test data from the given instance of test data.

8. The method of claim 1, wherein the robustness information for the second NLP model is determined via a black box attack.

9. The method of claim 1, wherein the robustness information for the first NLP model is determined via a white box attack.

10. The method of claim 1, wherein a modification trigger is one of a replacement trigger or an insertion trigger.

11. The method of claim 1, wherein a modification trigger comprises at least one of a modification trigger token or a syntactical structure.

12. The method of claim 1, wherein a modifying token of the one or more modifying tokens has a same polarity as a modification trigger token of a corresponding modification trigger and satisfies a similarity relationship with respect to the corresponding modification trigger.

13. The method of claim 12, wherein a distance between an embedding vector corresponding to the modifying token and an embedding vector corresponding to the modification trigger token is no greater than a threshold distance within the embedding space.

14. The method of claim 1, wherein the identifying of the at least one potential trigger and the obtaining of the at least one instance of test data are performed responsive to receiving a request for validation of the first NLP model or a second NLP model.

15. The method of claim 1, further comprising receiving a white box attack or black box attack request generated by a model validation application, wherein the robustness results are provided to the model validation application for use in a model validation process.

16. The method of claim 1, further comprising automatically initiating additional training of the first NLP model based on the robustness information.

17. An apparatus for determining robustness information corresponding to a natural language processing (NLP) model, the apparatus comprising:
processor circuitry configured to:
identify at least one potential trigger token by search an embedding space of a first NLP model based on a loss function for the first NLP model;
obtain at least one instance of test data, the at least one instance of test data (a) comprising one or more words, (b) having a syntax, and (c) having a semantic meaning;
based on the at least one potential trigger token and the at least one instance of test data, determine at least one modification trigger;
determine one or more modifying tokens corresponding to the at least one modification trigger;
generate one or more instances of modified test data wherein each modified instances of test data is generated by:
identifying a location of the at least one modification trigger within the at least one instance of test data, and
generating a new instance of modified test data which is the instance of test data modified at the location of the at least one modification trigger by one of the one or more modifying tokens corresponding to the at least one modification trigger;
provide the at least one instance of test data and the one or more instances of modified test data as input to the first NLP model;
for each of the at least one instance of test data and the one or more instances of modified test data provided as input to the first NLP model, obtain a corresponding output from the first NLP model;
determine, using a machine learning model, which of the one or more instances of modified test data provided as input to the first NLP model correspond to an output that does not satisfy a similarity criteria with respect to the output corresponding to the corresponding instance of test data;
determine robustness information for the first NLP model based on which of the one or more instances of modified test data correspond to an output that does not satisfy a similarity criteria with respect to the output corresponding to the corresponding instance of test data; and
cause the robustness information for the first NLP model to be provided,
wherein the processor circuitry is further configured to:
determine one or more output changing modification rules based on which of the one or more instances of modified test data correspond to an output that does not satisfy a similarity criteria with respect to the output corresponding to the corresponding instance of test data;
generate a set of instances of modified test data based on a set of instances of test data and the one or more output changing modification rules;
provide at least a portion of the set of instances of modified test data and the set of instances of test data to a second NLP model;
for each instance of the at least a portion of the set of instances of modified test data and the set of instances of test data provided to the second NLP model, obtain a corresponding second NLP model output from the second NLP model;
based on the second NLP model output for each of the instances of the at least a portion of the set of instances of modified test data and the set of instances of test data provided to the second NLP model, determine robustness information for the second NLP model; and
cause the robustness information for the second NLP model to be provided.

18. The apparatus of claim 17, wherein the processing circuitry is further configured to:
determine one or more output changing modification rules based on which of the one or more instances of modified test data correspond to an output that does not satisfy a similarity criteria with respect to the output corresponding to the corresponding instance of test data, wherein the robustness information for the second NLP model is determined via a black box attack.

19. The apparatus of claim 17, wherein the identifying of the at least one potential trigger and the obtaining of the at least one instance of test data by the processor are performed responsive to the processor receiving a request for validation of the first NLP model.

20. The apparatus of claim 17, wherein the processor is further configured to automatically initiate additional training of the first NLP model based on the robustness information.

* * * * *